US011474194B2

(12) United States Patent
Qiu et al.

(10) Patent No.: US 11,474,194 B2
(45) Date of Patent: Oct. 18, 2022

(54) CONTROLLING A DEVICE BY TRACKING MOVEMENT OF HAND USING ACOUSTIC SIGNALS

(71) Applicant: Board of Regents, The University of Texas System, Austin, TX (US)

(72) Inventors: Lili Qiu, Austin, TX (US); Wenguang Mao, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/269,671

(22) PCT Filed: Aug. 22, 2019

(86) PCT No.: PCT/US2019/047653
§ 371 (c)(1),
(2) Date: Feb. 19, 2021

(87) PCT Pub. No.: WO2020/041563
PCT Pub. Date: Feb. 27, 2020

(65) Prior Publication Data
US 2021/0199751 A1 Jul. 1, 2021

Related U.S. Application Data

(60) Provisional application No. 62/722,110, filed on Aug. 23, 2018.

(51) Int. Cl.
*G01S 3/80* (2006.01)
*G01S 3/801* (2006.01)
(Continued)

(52) U.S. Cl.
CPC ............... *G01S 5/28* (2013.01); *G01S 3/801* (2013.01); *G01S 3/8006* (2013.01); *G01S 5/20* (2013.01)

(58) Field of Classification Search
CPC .......... G01S 5/28; G01S 3/8006; G01S 3/801; G01S 5/20
(Continued)

(56) References Cited

U.S. PATENT DOCUMENTS

2011/0025563 A1 2/2011 Ferreol et al.
2012/0326917 A1 12/2012 Kiehne
(Continued)

FOREIGN PATENT DOCUMENTS

EP 2930530 A1 10/2015

OTHER PUBLICATIONS

Mao et al., "RNN-Based Room Scale Hand Motion Tracking," MobiCom '19: The 25th Annual International Conference on Mobile Computing and Networking, Oct. 2019, Article No. 38, pp. 1-16.
(Continued)

*Primary Examiner* — Daniel L Murphy
(74) *Attorney, Agent, or Firm* — Robert A. Voigt, Jr.; Shackelford, Bowen, McKinley & Norton, LLP

(57) ABSTRACT

A method, device and computer program product for controlling the device by tracking a movement of a hand or other objects. The device receives acoustic signals. At least a portion of the received signals are transformed into two-dimensional sinusoids whose frequencies are proportional to an angle-of-arrival (AoA) and a propagation distance of the reflected signals. An AoA-distance profile is derived based on signals received from the object by evaluating frequencies of the two-dimensional sinusoids. Then, an AoA-distance pair is derived from the AoA-distance profile. A current location of the object is determined based on the estimated AoA-distance pair. The device then performs a command in response to detecting that the user moved to perform the command based on prior and current locations of the object.

20 Claims, 15 Drawing Sheets

(51) Int. Cl.
*G01S 5/28* (2006.01)
*G01S 5/20* (2006.01)

(58) Field of Classification Search
USPC .......................................................... 367/127
See application file for complete search history.

(56) References Cited

U.S. PATENT DOCUMENTS

| 2014/0192999 | A1 | 7/2014 | Sannino |
| 2015/0054794 | A1 | 2/2015 | Li et al. |
| 2016/0103207 | A1 | 4/2016 | Shirakawa et al. |
| 2016/0321917 | A1 | 11/2016 | Qiu et al. |
| 2017/0164321 | A1 | 6/2017 | Qiu et al. |
| 2017/0212235 | A1 | 7/2017 | Qiu et al. |
| 2017/0328983 | A1 | 11/2017 | Volgyesi et al. |
| 2018/0143297 | A1 | 5/2018 | Jansen |
| 2018/0164874 | A1 | 6/2018 | Qiu et al. |

OTHER PUBLICATIONS

Wang et al., "Device-Free Gesture Tracking Using Acoustic Signals," MobiCom '16: Proceedings of the 22nd Annual International Conference on Mobile Computing and Networking, Oct. 2016, pp. 82-94.
International Search Report for International Application No. PCT/US2019/047653 dated Nov. 7, 2019, pp. 1-2.
Written Opinion of the International Searching Authority for International Application No. PCT/US2019/047653 dated Nov. 7, 2019, pp. 1-18.
Partial European Search Report for European Application No. 19 852 791.3 dated May 16, 2022, pp. 1-15.
Extended European search report for European Patent Application No. 19 852 791.3 dated Aug. 17, 2022, pp. 1-14.

CONTROLLING A DEVICE BY TRACKING MOVEMENT OF HAND USING ACOUSTIC SIGNALS

CROSS REFERENCE TO RELATED APPLICATIONS

This application claims priority to U.S. Provisional Patent Application Ser. No. 62/722,110, entitled "Controlling a Device by Tracking Movement of Hand Using Acoustic Signals," filed on Aug. 23, 2018, which is incorporated by reference herein in its entirety.

TECHNICAL FIELD

The present invention relates generally to controlling devices, and more particularly to controlling a device (e.g., smart speaker) by tracking the movement of an object, such as a hand, using acoustic signals.

BACKGROUND

Smart devices, such as smart speakers, are electronic devices generally connected to other devices or networks that can operate to some extent interactively and autonomously. For example, a smart speaker is a type of wireless speaker and voice command device with an integrated virtual assistant (artificial intelligence) that offers interactive actions and hands-free activation with the help of one "hot word" (or several "hot words"). Some of these smart speakers can also act as a smart device that utilizes Wi-Fi®, Bluetooth® and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

Currently, smart devices, such as smart speakers, are controlled via voice commands. However, voice-based control is not always suitable. For example, voice control degrades significantly in a noisy environment due to interference. In addition, developing smart speakers that can understand multiple languages for families with members speaking different languages and automatically identifying the language being used is challenging and costly. Moreover, in several usage scenarios, such as interacting with a screen or selecting from many menu options, interacting with a voice-based interface can be cumbersome.

In comparison, motion-based control is appealing in these scenarios, and complements well with the voice-based control.

Unfortunately, there is not currently a means for controlling such smart devices, such as smart speakers, using motion, such as hand motion, either independently or jointly with voice-based control.

SUMMARY

In one embodiment of the present invention, a method for tracking a movement of an object comprises receiving acoustic signals from the object using one or more microphones in a device. The method further comprises transforming at least a portion of the received acoustic signals into two-dimensional sinusoids whose frequencies are proportional to an angle-of-arrival and a propagation distance of the object. The method additionally comprises deriving an angle-of-arrival-distance profile based on signals received from the object by evaluating frequencies of the two-dimensional sinusoids. Furthermore, the method comprises estimating an angle of arrival and a distance based on the angle-of-arrival-distance profile. Additionally, the method comprises determining a current location of the object based on the estimated angle of arrival and the estimated distance.

Other forms of the embodiment of the method described above are in a device and in a computer program product.

In another embodiment of the present invention, a method for controlling a device comprises receiving acoustic signals using one or more microphones in the device transmitted from an object of a user. The method further comprises transforming at least a portion of the received signals into two-dimensional sinusoids whose frequencies are proportional to an angle-of-arrival and a propagation distance of the received signals. The method additionally comprises deriving an angle-of-arrival-distance profile based on the acoustic signals received from the object by evaluating frequencies of the two-dimensional sinusoids. Furthermore, the method comprises estimating an angle-of-arrival-distance pair from the angle-of-arrival-distance profile. Additionally, the method comprises determining a current location of the object based on the estimated angle-of-arrival-distance pair. In addition, the method comprises determining if the user moved to perform a command based on prior and current locations of the object. The method further comprises performing a command on the device in response to determining the user moved to perform the command.

Other forms of the embodiment of the method described above are in a device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
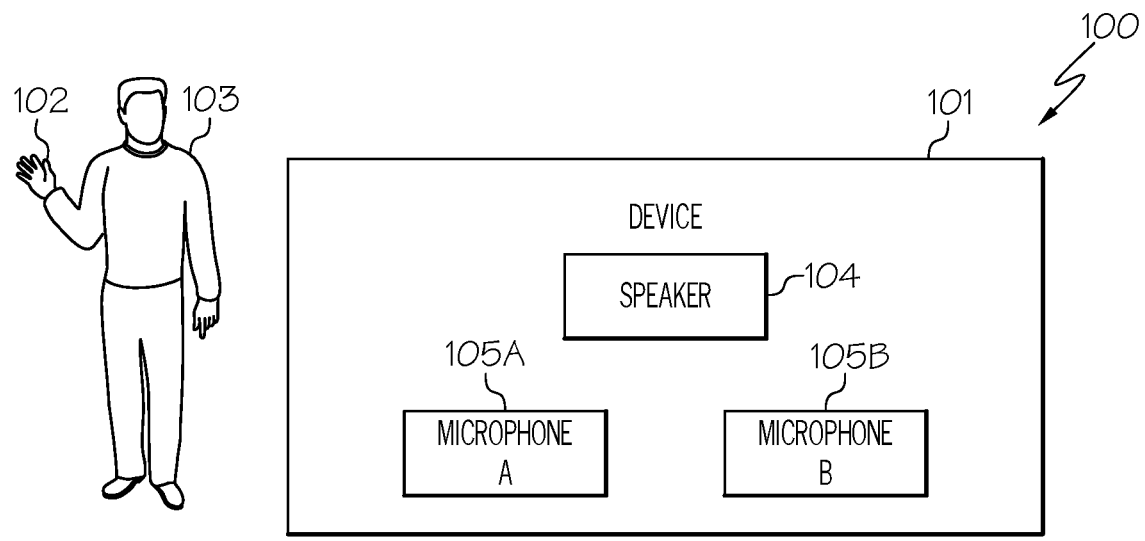
FIG. 1 illustrates a system configured in accordance with an embodiment of the present invention.

While the following discusses the present invention in connection with controlling a smart device, such as a smart speaker, using hand motion, the principles of the present invention may be applied to controlling other devices, such as a device with multiple microphones, using some form of body motion other than hand motion (e.g., head motion). For example, the principles of the present invention may be applied to smartphones with multiple speakers and/or microphones. A person of ordinary skill in the art would be capable of applying the principles of the present invention to such implementations. Further, embodiments applying the principles of the present invention to such implementations would fall within the scope of the present invention.

As discussed above in the Background section, currently, smart devices, such as smart speakers, are controlled via voice commands. However, voice-based control is not always suitable. For example, voice control degrades significantly in a noisy environment due to interference. In addition, developing smart speakers that can understand multiple languages for families with members speaking different languages and automatically identifying the language being used is challenging and costly. Moreover, in several usage scenarios, such as interacting with a screen or selecting from many menu options, interacting with a voice-based interface can be cumbersome. In comparison, motion-based control is appealing in these scenarios, and complements well with the voice-based control. Unfortunately, there is not currently a means for controlling such smart devices, such as smart speakers, using motion, such as hand motion, either independently or jointly with voice-based control.

While controlling smart devices using motion, such as hand motion, would vastly improve the ability of the user in controlling the device, tracking hand motion poses significant challenges. A desirable approach should be (i) low cost, (ii) easy to deploy on existing smart speaker hardware, (iii) accurate and reliable, and (iv) support room-scale tracking. Achieving all these goals is especially challenging. The principles of the present invention provide the means for achieving these goals with a novel roomscale device-free motion tracking system referred to herein as "RTrack."

In one embodiment, acoustic signals are used for tracking due to the following reasons. First, the popularity of smart speakers increases rapidly. They are equipped with multiple microphones and speakers. Effectively exploiting this setup can not only significantly enhance the tracking performance but also make it easy to deploy. Second, audio-based tracking provides high accuracy due to its slow signal propagation speed. Third, the sampling rate of acoustic signals is low so that all processing can be done in real-time using software running on commodity hardware. This provides freedom to customize the transmission signals and processing algorithms to achieve high accuracy.

To track an object, such as a user's hand, various embodiments of the present invention jointly estimate ("joint estimation") the distance (propagation distance of the reflected signals) and angle-of-arrival (AoA) based on its reflected signals using the 2D MUSIC algorithm or, alternatively, using both the 1D MUSIC algorithm and the 2D MUSIC algorithm. The "angle-of-arrival," as used herein, refers to the angle of the reflected signal arriving at the device, such as the smart speaker, as discussed further below.

As discussed in further detail below, it is shown that the joint estimation is promising for room-scale device-free tracking for the following reasons. First, the signal-to-noise ratio (SNR) from hand reflection can be below −20 dB in room scale tracking, which significantly degrades the tracking accuracy. Joint estimation increases the effective number of sensors, thereby improving accuracy. Second, the background reflection can dominate the hand reflection in room-scale tracking and introduce significant ambiguity. If one were to track the distance (propagation distance of the reflected signals) and AoA separately, the total number of ambiguities becomes the product of possible distances and AoAs. In comparison, joint estimation can effectively reduce the number of ambiguities since not all distance and AoA combinations occur in the two-dimensional (2D) profile.

To further enhance the tracking performance, embodiments of the present invention may implement the following series of techniques: (i) a non-uniform microphone placement to improve accuracy without increasing ambiguity, (ii) using overlapping transmission signals to increase the number of acoustic samples used for joint estimation and improve accuracy without increasing bandwidth or latency, (iii) speeding up computation to support real-time tracking, and (iv) a simple yet effective initialization algorithm to reliably determine the initial hand position.

As discussed further below, the system of the present invention can track multiple users simultaneously.

In the following description, numerous specific details are set forth to provide a thorough understanding of the present invention. However, it will be apparent to those skilled in the art that the present invention may be practiced without such specific details. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a system 100 configured in accordance with an embodiment of the present invention. Referring to FIG. 1, system 100 includes a device 101, such as a smart device (e.g., smart speaker, smartphone) to be controlled by a hand 102 of a user 103. Device 101 may be any smart device that contains a speaker 104 and microphones 105A-105B (identified as "Microphone A" and "Microphone B," respectively, in FIG. 1). Microphones 105A-105B may collectively or individually be referred to as microphones 105 or microphone 105, respectively. While FIG. 1 illustrates device 101 as including a single speaker 104 and two microphones 105, device 101 of the present invention is not to be limited in scope to only including a speaker 104 and two microphones 105. Instead, device 101 may include one or more speakers 104 and one or more microphones 105. Furthermore, in one embodiment, device 101 may leverage multiple speakers 104. For example, an embodiment of device 101 containing two speakers 104 with two microphones 105 may achieve the same result in controlling device 101 as discussed below as device 101 containing a single speaker 104 with four microphones 105. Furthermore, in one embodiment, speakers 104 and/or microphones 105 may be located along the z-axis in three-dimensional space. Some examples of device 101 include but not limited to smart speakers, smartphones, smart TVs and smart appliances.

Device 101 is configured to emit an audio signal through its speaker 104, whether audible or inaudible to humans. Furthermore, device 101 is configured to receive an audio signal by microphones 105 that is reflected by the user's hand 102. This reflected audio signal is used by device 101 to continuously track hand 102 in real time as discussed further below. By tracking the movement of hand 102, device 101 can determine if the user is gesturing a command to be executed on device 101, such as "play music" or "tell me the weather," as discussed further below. A more detailed description of a hardware configuration of an embodiment of device 101 is provided below in connection with FIG. 2.

Figure 2:
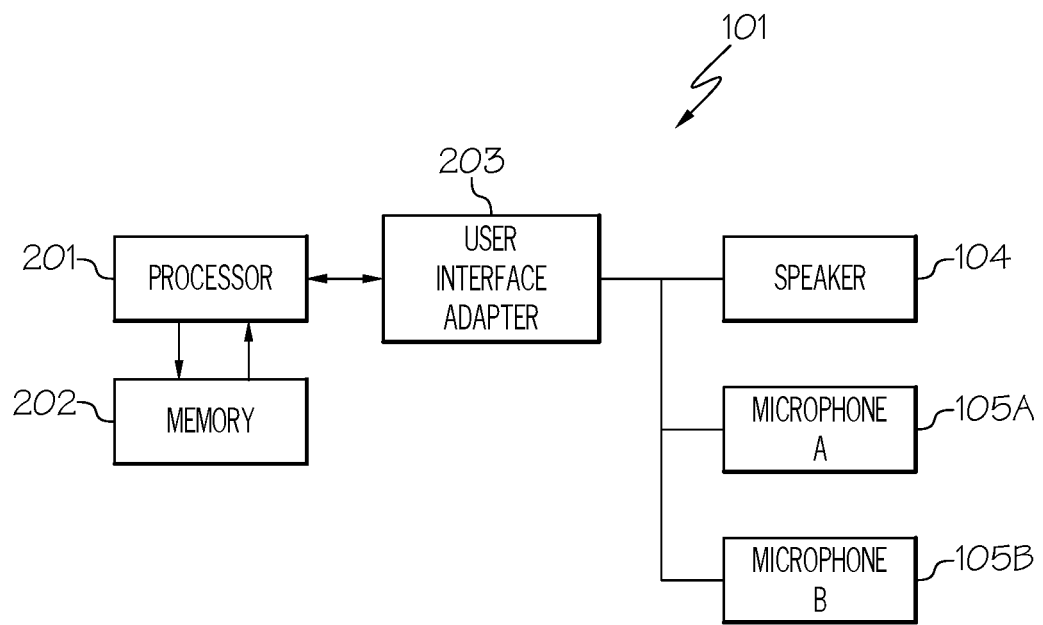
FIG. 2 illustrates a hardware configuration of a device to be controlled by the movement of a hand in accordance with an embodiment of the present invention.

Referring now to FIG. 2, FIG. 2 is a functional block diagram of an example of device 101 (FIG. 1). In this example, device 101 includes a processor 201. Processor 201 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, electronic units, or a combination thereof.

Processor 201 is configured to store data received by one or more interfaces and process and store the data on a memory 202. Memory 202 can be implemented within processor 201 or external to processor 201. As used herein, the term memory refers to any type of long term, short term, volatile, nonvolatile, or other memory and is not to be limited to any particular type of memory or number of memories or type of media upon which memory is stored. In one embodiment, memory 202 stores an application, such as a program for controlling device 101 using the movements by hand 102 (FIG. 1) by allowing device 101 to continuously track the movement of hand 102 using acoustic signals. In one embodiment, processor 201 is configured to execute the program instructions of applications stored in memory 202.

Furthermore, speaker 104 and microphones 105A, 105B are connected to device 101 via a user interface adapter 203. Speaker 104 is configured to generate an audio signal (audible or inaudible to humans) at various frequencies. Furthermore, microphones 105A, 105B are configured to receive an audio signal that is reflected by the user's hand 102.

Device 101 of FIG. 2 is not to be limited in scope to the elements depicted in FIG. 2 and may include fewer or additional elements than depicted in FIG. 2.

The present invention may be a system, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above in the Background section, currently, smart devices, such as smart speakers, are controlled via voice commands. However, voice-based control is not always suitable. For example, voice control degrades significantly in a noisy environment due to interference. In addition, developing smart speakers that can understand multiple languages for families with members speaking different languages and automatically identifying the language being used is challenging and costly. Moreover, in several usage scenarios, such as interacting with a screen or selecting from many menu options, interacting with a voice-based interface can be cumbersome. In comparison, motion-based control is appealing in these scenarios, and complements well with the voice-based control. Unfortunately, there is not currently a means for controlling such smart devices, such as smart speakers, using motion, such as hand motion, either independently or jointly with voice-based control.

The principles of the present invention provide a means for controlling smart devices, such as smart speakers, using motion either independently or jointly with voice-based control as discussed below in connection with FIGS. 3A-3B, 4-6, 7A-7B, 8A-8B, 9A-9B and 10-17.

While the following discusses controlling device 101 by having device 101 be stationary, device 101 does not necessarily have to be stationary. Instead, device 101 (including speaker 104 and microphones 105) may be moveable, such as to be placed in a better position to collect reflections.

Figure 3A:
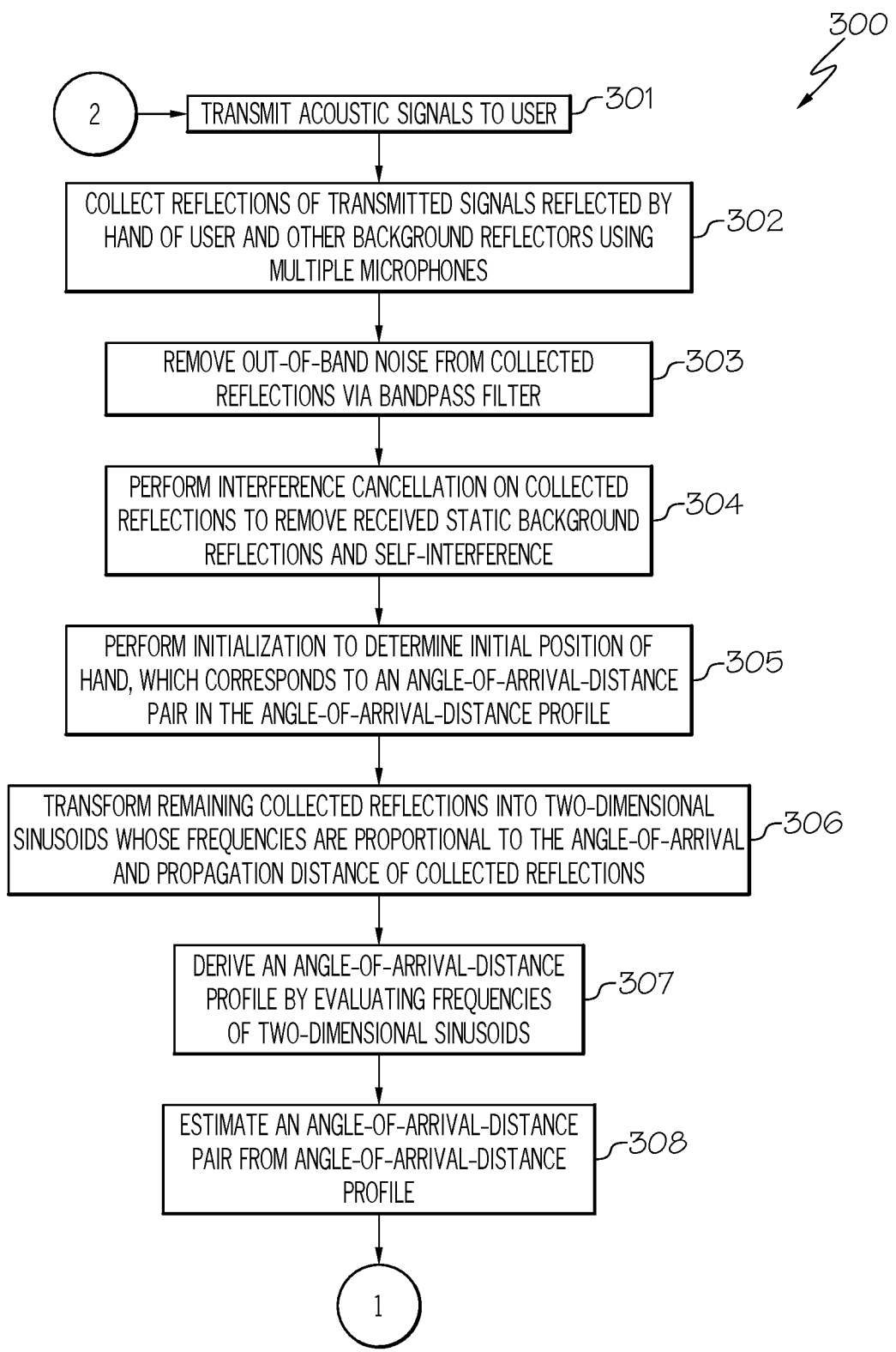
FIGS. 3A-3B are a flowchart of a method for controlling a smart device (e.g., smart speaker) using motion from a hand of a user in accordance with an embodiment of the present invention.
Figure 3B:
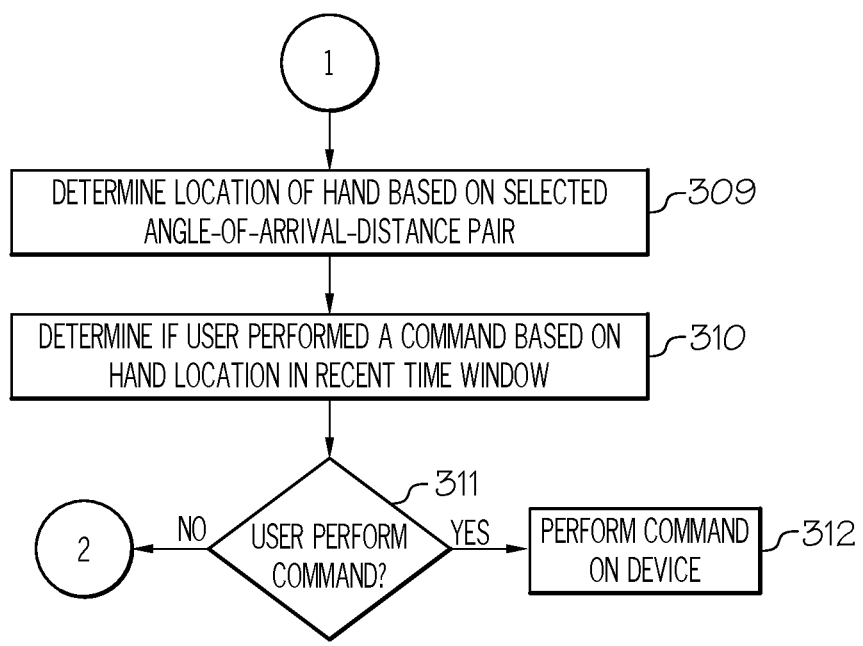

FIGS. 3A-3B are a flowchart of a method 300 for controlling a smart device (e.g., smart speaker) using motion from a hand 102 (FIG. 1) of a user 103 (FIG. 1) in accordance with an embodiment of the present invention.

Referring to FIG. 3A, in conjunction with FIGS. 1-2, in step 301, device 101 transmits acoustic signals to user 103 using speaker 104.

Figure 4:
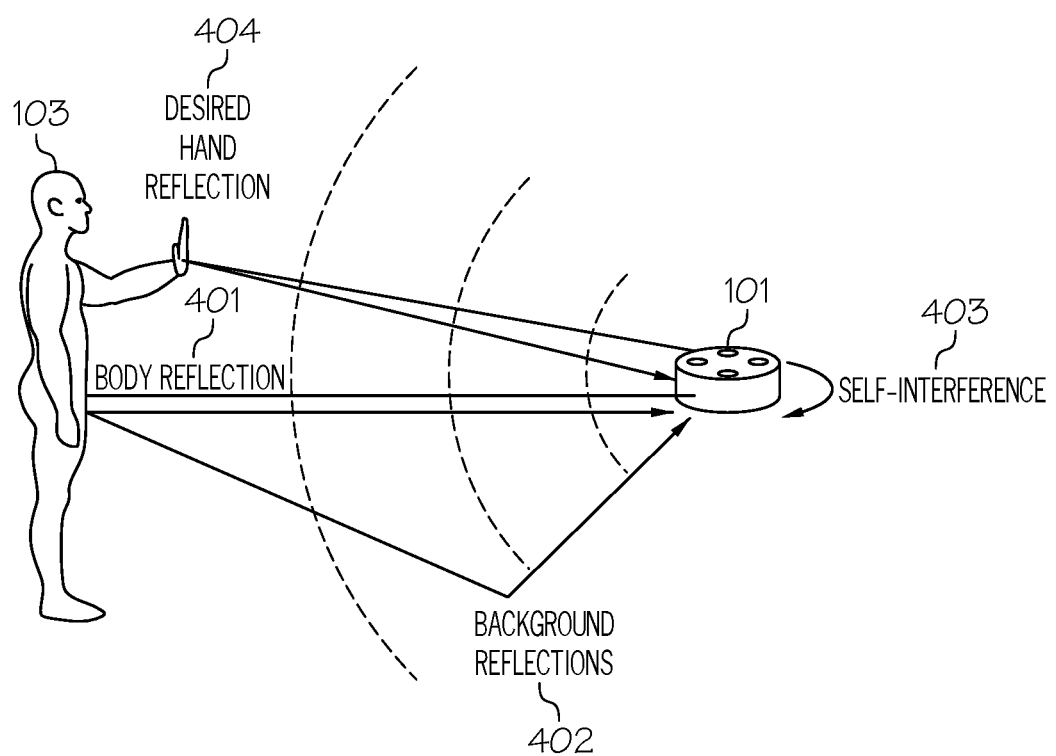
FIG. 4 illustrates the types of reflections that are collected by the device in accordance with an embodiment of the present invention.

In step 302, device 101 collects the reflections of the transmitted acoustic signals using microphones 105, where the acoustic signals were reflected by hand 102 of user 103 and other background reflectors as shown in FIG. 4. In one embodiment, to assist device 101 in collecting the reflections of the transmitted acoustic signals, a metallic structure (e.g., aluminum structure) may be placed in close proximity to device 101 (e.g., surrounding device 101) to direct the reflections directly to device 101. In one embodiment, such a structure is designed with a parabolic shape.

While the following discusses collecting the acoustic signals reflected by hand 102 of user 103, the principles of the present invention may apply to collecting acoustic signals reflected by other reflectors, such as a credit card or a piece of paper. In other words, the movement of other objects (e.g., credit card, user body, wallet, card, cup, book, etc.) may be tracked and used as a reflector in the same manner as tracking the movement of hand 102 of user 103 discussed below.

Referring to FIG. 4, FIG. 4 illustrates the types of reflections that are collected by device 101 in accordance with an embodiment of the present invention. As shown in FIG. 4, device 101 may collect body reflections 401 (reflections from other parts of the body of user 103 besides hand 102), background reflections 402 (reflections from other objects, such as in a room) and self-interference 403. Furthermore, as shown in FIG. 4, device 101 collects the desired hand reflections 404 as well. As discussed below, there are a series of techniques implemented by the present invention to remove the body and background reflections as well as the self-interference so that the present invention can mainly utilize the hand reflections 404 to determine the location of hand 102.

Returning to FIG. 3A, in conjunction with FIGS. 1-2 and 4, in step 303, device 101 removes the out-of-band noise (e.g., background reflections 402) from the collected reflections via a bandpass filter.

In step 304, device 101 performs interference cancellation on the collected reflections to remove the received static background reflections 402 and self-interference 403. In one embodiment, with respect to device-based tracking, interference cancellation is not performed in step 305. Instead, frequency offset is estimated, such as after step 301.

In step 305, device 101 performs initialization to determine the initial position of hand 102 of user 103, which corresponds to an angle-of-arrival (AoA)-distance pair in the AoA-distance profile as discussed further below.

In step 306, device 101 transforms the remaining collected reflections signals (after performing steps 304 and 305) into two-dimensional sinusoids whose frequencies are proportional to the angle-of-arrival and propagation distance of the collected reflections. The "angle-of-arrival," as used herein, refers to the angle of the reflected signal arriving at device 101. The "propagation distance," as used herein, refers to the distance the reflected signal traveled from the initial point of reflection to device 101.

In step 307, device 101 derives an angle-of-arrival (AoA)-distance profile, which may contain a mapping of angle-of-arrival angles with various propagation distances of signals reflected by hand 102 of user 103, by evaluating the frequencies of the two-dimensional sinusoids using an algorithm, such as the 2D (two-dimensional) MUSIC algorithm. In one embodiment, the AoA-distance profile is derived based on signals received from an object, such as hand 102, by evaluating frequencies of the two-dimensional sinusoids.

Two further embodiments are developed to estimate the AoA and distance from the AoA-distance profile. In one embodiment, a peak from the AoA-distance profile is selected and used to estimate the AoA, distance, and Doppler shift. In the second embodiment, device 101 applies the AoA-distance profiles from the recent time window to the Recurrent Neural Network (RNN) to estimate the AoA and distance.

Figure 15:
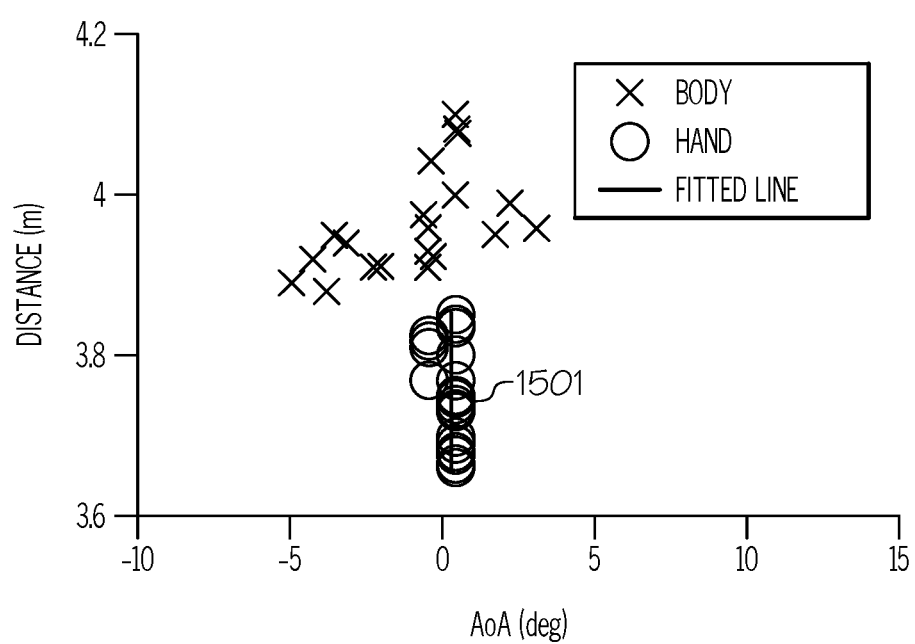
FIG. 15 is a graph showing the spikes for the hand and the body of the user over 1 second in accordance with an embodiment of the present invention.

In an alternative embodiment, in step 308, device 101 estimates an angle-of-arrival-distance pair from the angle-of-arrival-distance profile. In one embodiment, the angle-of-arrival-distance pair is estimated from the angle-of-arrival-distance profile based on the estimated propagation distance of the signal reflected by hand 102 of user 103. As discussed above, the "spike" closes to the previous spike is selected. The "spike" corresponds to the propagation delays for the corresponding angle-of-arrival as shown in FIG. 15. For example, spike 1501 corresponds to the grouping of propagation distances of the signals reflected by hand 102 for a corresponding angle-of-arrival. As discussed above, the first time the spike is selected based on a previously selected spike position of hand 102, the previously selected spike position corresponds to the initial hand position. The appropriate angle-of-arrival-distance pair is selected based on the estimated propagation distance of step 307, which corresponds to one of the propagation distances in the selected spike.

Referring now to FIG. 3B, in conjunction with FIGS. 1-2, 4-6, 7A-7B, 8A-8B, 9A-9B and 10-17, in step 309, device 101 determines the location of hand 102 based on the selected angle-of-arrival-distance pair. By knowing the propagation distance from a signal reflected from hand 102 and the angle-of-arrival of the reflected signal to device 101, one can determine an accurate location of hand 102, in terms of an a x-y coordinate system or in terms of an x-y-z coordinate system.

A more detailed discussion regarding steps 301-309 is provided below.

As previously discussed, the present invention develops a new device-free tracking system referred to herein as the "RTrack" to address the challenges discussed above. RTrack relies on speakers and microphones, such as available on smart devices, and can precisely track a user's hand motion with a working range covering a typical room. To determine the positions of the user's hand 102, in one embodiment, a 2D MUSIC algorithm was applied to jointly estimate the angle-of-arrival (AoA) and propagation distance of signals reflected by hand 102.

The joint estimation framework of the present invention has the following advantages for far field tracking. First, the framework combines frequency-modulated continuous wave (FMCW) and MUltiple SIgnal Classification (MUSIC) for distance and AoA estimation, both of which are more effective under low SNR than other alternatives. Second, it increases the effective number of sensors, which is helpful to significantly improve the tracking accuracy. Third, jointly estimating distance and AoA makes it much easier to resolve multipath since either the distance or the AoA of these paths are different. Fourth, several mechanisms are developed to significantly enhance the tracking performance under low SNR scenarios and reduce computation time to enable real-time tracking.

In one embodiment, the present invention jointly estimates the AoA and propagation distance of the signals reflected by the user's hand 102. For this purpose, device 101 sends acoustic chirp signals via speaker 104 and collects the received samples using microphones 105. The received signals will then be transformed into two-dimensional sinusoids whose frequencies are proportional to the AoA and distance. Then, the present invention estimates them by evaluating the frequencies of the two-dimensional sinusoids. The transformation procedures are described as follows.

Figure 5:
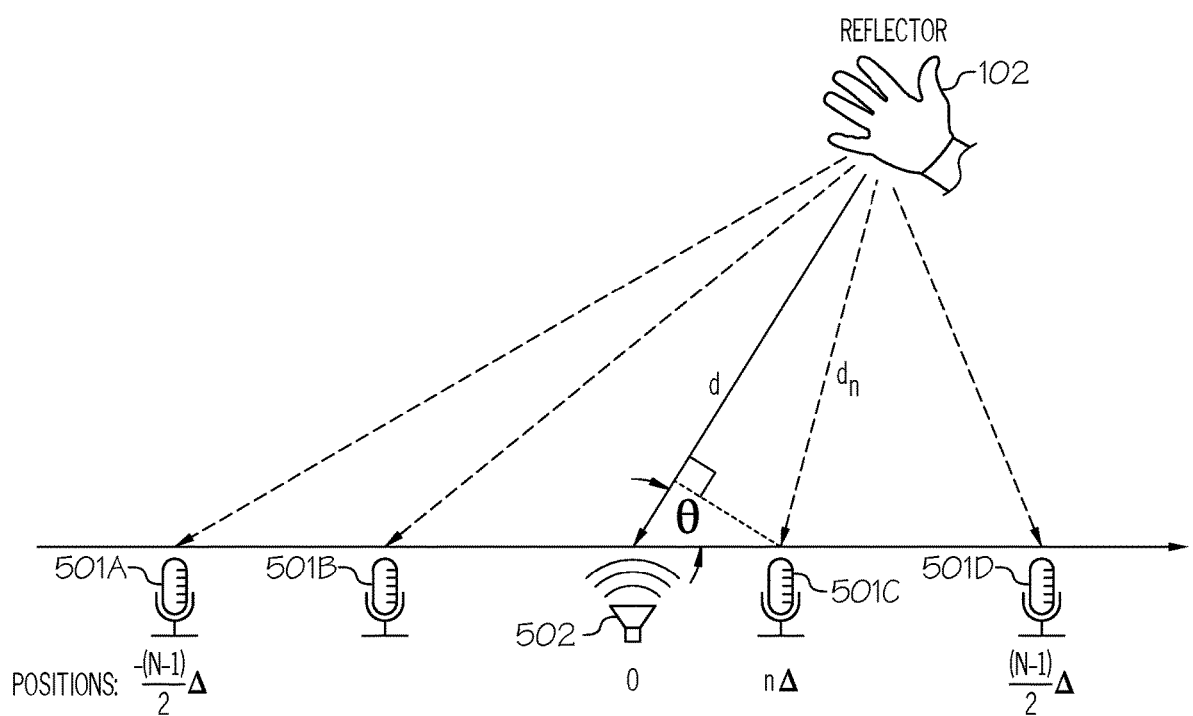
FIG. 5 illustrates the angle-of-arrival and the propagation distance in accordance with an embodiment of the present invention.

Consider N microphones (MIC) and a speaker as shown in FIG. 5. FIG. 5 illustrates the AoA (θ) and propagation distance (d+$d_n$) in accordance with an embodiment of the present invention.

Referring to FIG. 5, for simplicity, assume N is odd. The MICs (microphones) 501A-501D (correspond to microphones 105) are indexed from $$-\frac{N-1}{2} \text{ to } \frac{N-1}{2},$$

and uniformly distributed along a line. The separation between two consecutive MICs is Δ. Speaker 502 (corresponds to speaker 104) is at the center of the line. In this case, the distance $r_n$ between speaker 502 and the n-th MIC is nΔ.

To measure the AoA (θ) and distance (d) of the signals reflected by the user's hand 102, speaker 104/502 sends chirps (signal in which the frequency increases (up-chirp) or decreases (down-chirp) with time), whose frequency linearly sweeps from f to f+β during period T. Let $y_t$ denote the transmitted chirp. Then $$y_t(t) = \cos\left[2\pi\left(ft + \frac{B}{2T}t^2\right)\right].$$

The chirps are reflected by the user's hand 102 and received by the MICs 105/501A-501D. Let $t_n$ denote the signal propagation delay for the n-th MIC. As shown in FIG. 5, $t_n = (d+d_n)/v_s$, where $v_s$ is the speed of sounds. Moreover, $d_n$ can be approximated by $d - r_n \cos(\theta)$, and $r_n = n\Delta$. Thus, $t_n = 2d/v_s - n\Delta \cos(\theta)/v_s$. Let $t_d$ denote $2d/v_s$ and $\delta$ denote $\Delta \cos(\theta)/v_s$. Then $t_n = t_d - n\delta$. The received chirp of MIC n is given by $$y_r^n = \cos\left\{2\pi\left[f(t-t_n) + \frac{B}{2T}(t-t_n)^2\right]\right\}.$$

As FMCW, $y_t$ and $y_r^n$ are multiplied and a low pass filter is applied. Let $s(n, t)$ denote the obtained signals. Based on the property of $2\cos(p)\cos(q) = \cos(p-q) + \cos(p+q)$, $s(n, t)$ is given by $$s(n, t) = \cos\left[2\pi\left(ft_n + \frac{B}{T}t t_n - \frac{B}{2T}t_n^2\right)\right].$$

By substituting $t_n = t_d - n\delta$, the phase of $s(n, t)$ becomes $$2\pi\left[-f\delta \cdot n + \frac{B}{T}t_d \cdot t + ft_d - \frac{B}{2T}t_d^2 - \frac{B}{T}n\delta t + \frac{B}{T}n\delta t_d - \frac{B}{2T}(n\delta)^2\right].$$

The third and fourth items are independent of n and t, and φ is used to denote their sum. The last three items are small and can be safely ignored. Then $$s(n, t) = \cos 2\pi\left[-f\delta \cdot n + \frac{B}{T}t_d \cdot t + \phi\right]. \quad (1)$$

It is observed that $s(n, t)$ is a two-dimensional (2D) sinusoid. It has the frequency $\Omega = 2\pi(-f\delta) = 2\pi(-f\Delta \cos(\theta)/v_s)$ for the n dimension, and the frequency $\omega = 2\pi\beta t_d/T = 4\pi\beta d/(T v_s)$ for the t dimension. Thus, to determine the AoA θ and distance d, one needs only to estimate Ω and ω.

To determine frequencies Ω and ω of a 2D sinusoid, one can apply the 2D Fast Fourier transform (FFT) on $s(n, t)$, and locate the peak in the 2D spectrum. However, due to only a few MICs (e.g., 4 MICs in one implementation), the estimation accuracy based on 2D FFT is very limited. A better approach for this purpose is to apply the 2D MUSIC algorithm, which estimates the frequencies of complex 2D sinusoids (e.g., $e^{j(\Omega n + \omega t)}$. Since a real sinusoid $\cos(p)$ is the sum of two complex sinusoids $e^{jp}$ and $e^{-jp}$, one can apply the 2D MUSIC algorithm to determine the frequencies of $s(n, t)$.

The derivation of the 2D MUSIC algorithm is described as follows. The main idea is to convert a 2D signal matrix to a 1D vector, and apply the classic 1D MUSIC algorithm.

Consider 2D signals S, which contains L complex sinusoids, i.e., $$S(n, t) = \sum_{i=1}^{L} c_i e^{j(\Omega_i n + \omega_i t)} + W(n, t), \quad (2)$$

where n falls into [0, N−1], and t belongs to [0, T−1]. $c_i$ is the magnitude of the i-th sinusoid, and $\Omega_i$ and $\omega_i$ are its two frequencies in the n and t dimensions, respectively. W is the noise term. The matrix form of Eq. 2 is given by $$S = UCV' + W,$$

where C is a diagonal matrix with the i-th diagonal element equal to $c_i$. U is defined by $[u(\Omega_1), u(\Omega_2) \ldots u(\Omega_L)]$, where $u(\Omega) = [1, e^{j\Omega}, e^{j2\Omega}, \ldots, e^{j(N-1)\Omega}]$. V and v are defined in a similar way for ω. The prime denotes the transpose operator. It can be easily validated that the $(n, t)^{th}$ element of S is the same as Eq. 2 by multiplying U, C, and V'. Next, S is converted into a vector $\tilde{s}$ by concatenating all its columns. Then it can be shown that $$\tilde{s} = vec(S) = vec(UCV') + vec(W)$$
$$= (V \otimes U)vec(C) + vec(W) = (V \otimes U)\tilde{c} + \tilde{w},$$

where vec is the vectorizing operator, and $\otimes$ is Kronecker product. $\tilde{c}$ and $\tilde{w}$ are vectorized from C and W. Here the property of $vec(XYZ) = (Z' \otimes X) vec(Y)$ is used.

To further simplify the expression of $\tilde{s}$, consider the $[(j-1)L+i]$-th element of $\tilde{c}$, which is equal to $C(i,j)$. Since C is diagonal matrix, $C(i,j) = 0$ when $i \neq j$, and $C(i, i) = c_i$. Also, the $[(j-1)L+i]$-th column of $V \otimes U$ is given by $v_j \otimes u_i$, where $v_i$ and $u_j$ are i-th and j-th columns of V and U, respectively. Thus, $$(V \otimes U)\tilde{c} = \sum_{i,j} C(i, j)(v_j \otimes u_i) = \sum_i c_i(v_i \otimes u_i)$$

Therefore, $\tilde{s}$ can be simplified as $$\tilde{s} = M\cdot\bar{c} + \tilde{w},$$

where $M = [v_1 \otimes u_1, v_2 \otimes u_2, \ldots, v_L \otimes U_L]$, and $\bar{c} = [c_1, c_2, \ldots, c_L]'$.

The remaining procedure is exactly the same as the 1D MUSIC algorithm. First, one calculates the covariance matrix $R_s$ as $\bar{s}\cdot\bar{s}^H$, where H is the Hermitian operator. Then, the eigenvalue decomposition on $R_s$ is performed, and the eigenvectors are sorted based on the magnitude of their eigenvalues in a descending order. Since the size of $R_s$ is NT×NT, one has NT eigenvectors. The last NT−L of them are called noise-space eigenvectors. Let N denote the matrix consisting of noise-space eigenvectors. It can be shown $N^H M = 0$. Since $v_i \otimes u_i$ is the i-th column of M, one knows that $N^H(v_i \otimes u_i) = 0$ for any i. Based on their definitions, $u_i$ and $v_i$ are given by $u(\Omega_i)$ and $v(\omega_i)$. To determine $(\Omega_i, \omega_i)$, the following metric is evaluated for any combination of $(\Omega, \omega)$ $$P(\Omega, \omega) = \frac{1}{(v(\omega) \otimes u(\Omega))^H N N^H (v(\omega) \otimes u(\Omega))}.$$

The L spikes in the profile of $P(\Omega, \omega)$ indicate the frequencies $(\Omega_i, \omega_1)$ of L sinusoids in signal S. In the system of the present invention, $\Omega = -2\pi\Delta \cos(\theta)/\lambda$ and $\omega = 4\pi\beta dT_s/(Tv_s)$, where $\lambda$ is the wavelength given by the ratio between chirp frequency f and sound speed $v_s$, $\Delta$ is the microphone separation, $\beta$ is the bandwidth, $T_s$ is the duration of an acoustic sample, and T is the chirp length. Also, $\theta$ is the AoA, and d is the distance. When $\Omega$ and $\omega$ are replaced with $\theta$ and d, one obtains $$P(\theta, d) = \frac{1}{(v(d) \otimes u(\theta))^H NN^H (v(d) \otimes u(\theta))}, \quad (3)$$

where $u(\theta) = [1, e^{-j2\pi\Delta \cos(\theta)/\lambda}, \ldots, e^{-j(N-1)2\pi\Delta \cos(\theta)/\lambda}]$, and $v(d) = [1, e^{j4\pi\beta dT_s/(Tv_s)}, \ldots, e^{j(N-1)4\pi\beta dT_s/(Tv_s)}]$.

In this way, one obtains an AoA-distance profile and the spikes correspond to the positions of hand 102 and other background reflectors. The above derivation is valid as long as L<NT. In the context of the present invention, it means that the 2DMUSIC algorithm can resolve a higher number of reflections (L) than that of microphones (N). This is equivalent to increasing the number of sensors in the system. The increased sensors also help significantly improve the estimation accuracy. Both AoA and distance errors are reduced by applying joint estimation with the 2D MUSIC algorithm.

Figure 6:
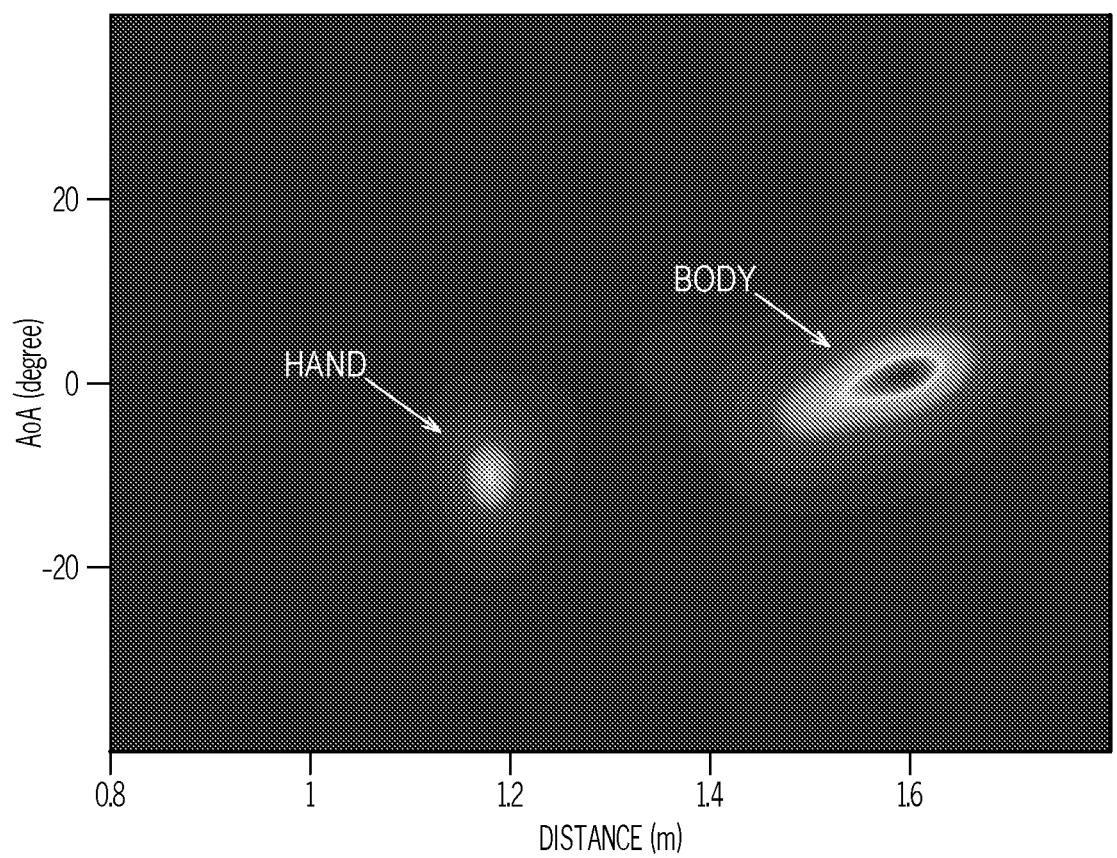
FIG. 6 shows the two-dimensional (2D) profile generated using Eq. 3 in accordance with an embodiment of the present invention.

FIG. 6 shows the 2D profile generated using Eq. 3 in accordance with an embodiment of the present invention. In this case, one clearly sees the peaks corresponding to hand and body reflections. This demonstrates that joint estimation help resolve multipath interference.

Joint estimation using the 2D MUSIC algorithm is beneficial for tracking. However, it is still insufficient to support room-scale tracking. To enable room-scale tracking, the accuracy of the 2D MUSIC algorithm under low SNR needs to be enhanced.

The mean square error c for estimating AoAs with MUSIC is determined by $$\epsilon \propto \frac{L}{\Delta^2 NT} \cdot \frac{1}{SNR}, \quad (4)$$

where L is the number of reflections in the received signals, $\Delta$ is the separation between MICs, N is the number of MICs, and T is the number of time-domain samples. Although the equation is derived for 1D MUSIC, it can be applied to 2DMUSIC since 2DMUSIC is actually transformed to a 1D version by vectorization.

Based on the insights from Eq. 4, the following strategies are used to reduce the estimation error under low SNR: (i) increase $\Delta$: the separation between MICs (e.g., place microphones at an unequal distance between each other), (ii) increase T: the number of samples used for estimation, and (iii) process the received signals to reduce L: the effective number of reflections. These approaches are elaborated in further details below.

Figure 7A:
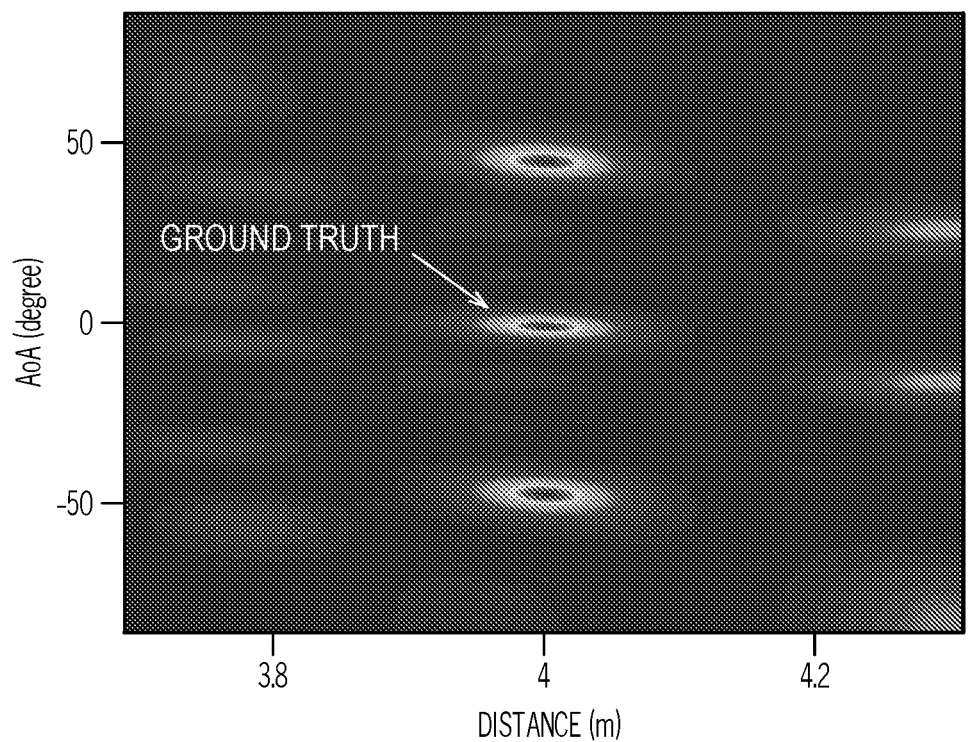
FIG. 7A shows an example 2D profile with ambiguity, where Δ is 2.7 cm and λ is 2.1 cm, in accordance with an embodiment of the present invention.

One way to improve MUSIC performance under low SNR is to increase the separation $\Delta$ between MICs. However, if $\Delta$ is larger than the half of wavelength, denoted by $\lambda$, there is ambiguity for estimating AoA. In this case, there exists two different angles $\theta_1$ and $\theta_2$ such that $-2\pi\Delta \cos(\theta_1)/\lambda = 2\pi\Delta \cos(\theta_2)/\lambda + 2\pi$. Based on Eq. 3, $P(\theta_1, d)$ is equal to $P(\theta_2, d)$ since $u(\theta_1) = u(\theta_2)$ in this case. If a peak is located at $(\theta_1, d_1)$ in the AoA-distance profile, there will be an identical peak at $(\theta_2, d_1)$. One cannot determine which one is due to a real signal. FIG. 7A shows an example 2D profile with ambiguity, where $\Delta$ is 2.7 cm and $\lambda$ is 2.1 cm, in accordance with an embodiment of the present invention. Two ambiguities at 50 and −50 degrees with the same magnitude and pattern are observed as the ground truth peaks at 0 degrees.

Figure 7B:
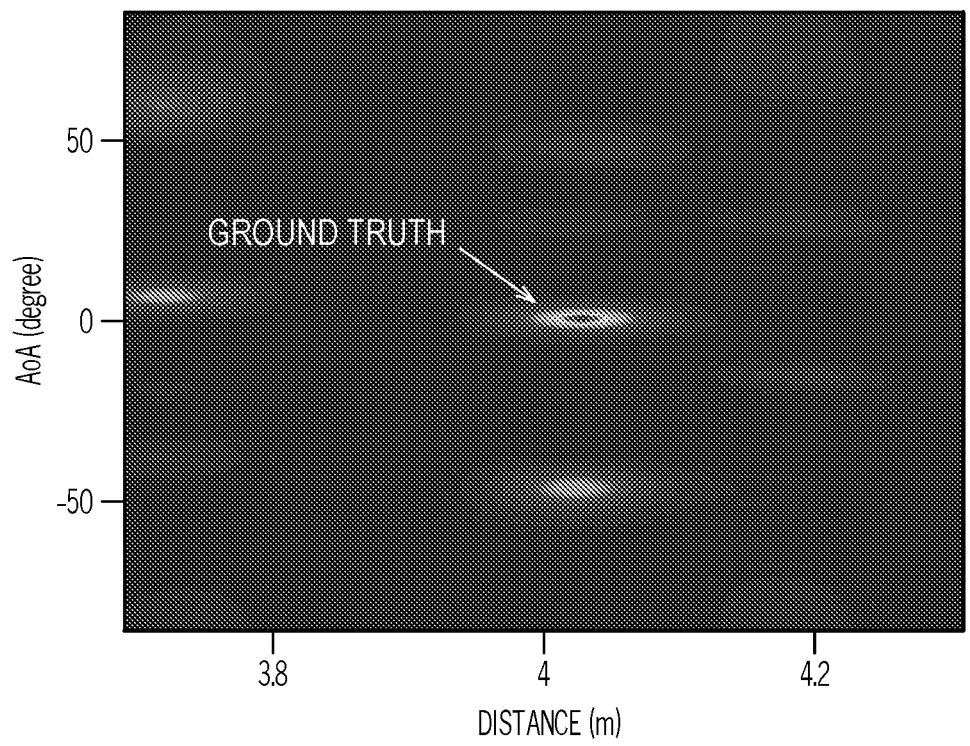
FIG. 7B shows an example 2D profile with less ambiguity than FIG. 7A due to the utilization of the non-uniform array in accordance with an embodiment of the present invention.

To increase the MIC separation without introducing ambiguity, a non-uniform MIC array is used. A non-uniform array includes pairs of MICs with small separation to reduce ambiguity as shown in FIG. 7B, and pairs of MICs with large separation to improve resolution. FIG. 7B shows an example 2D profile with less ambiguity than FIG. 7A due to the utilization of the non-uniform array in accordance with an embodiment of the present invention. The key issue is how to design an optimal non-uniform array to minimize ambiguity under low SNR.

In one embodiment, a vector $[m_1, m_2, \ldots, m_N]$ is used to describe a linear MIC array, where $m_i$ is the distance between the i-th and first MICs. $m_1$ is always zero and $m_N$ is the total size of the array. For a uniform array, $m_i = (i-1)\Delta$. Given this notation, $u(\theta)$ in Eq. 3 is generalized as $[e^{-j2\pi m_1 \cos(\theta)/\lambda}, e^{-j2\pi m_2 \cos(\theta)/\lambda}, \ldots, e^{-j2\pi m_N \cos(\theta)/\lambda}]$.

Figure 8A:
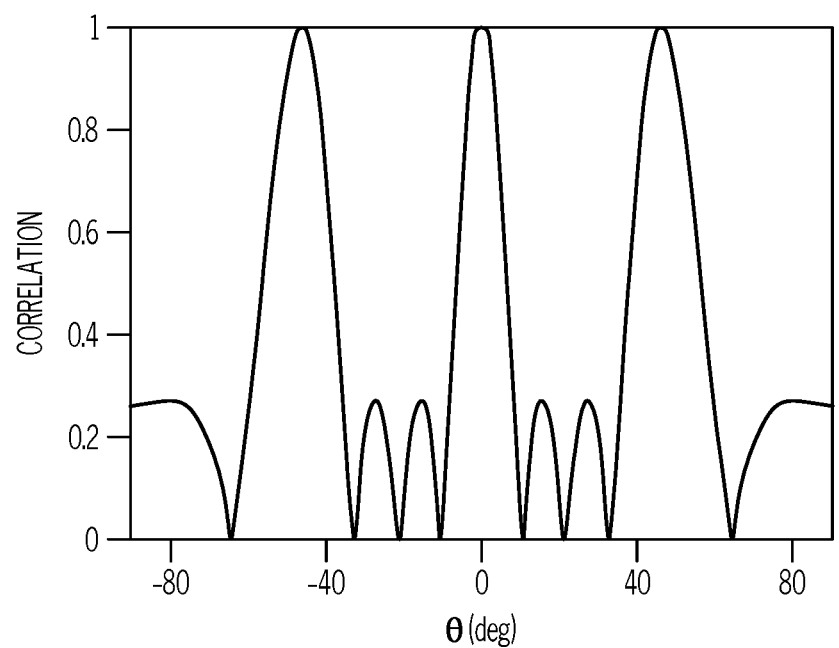
FIGS. 8A and 8B are plots of the correlation between u(0) and u(θ) for the uniform array case and the non-uniform array case, respectively, in accordance with an embodiment of the present invention.
Figure 8B:
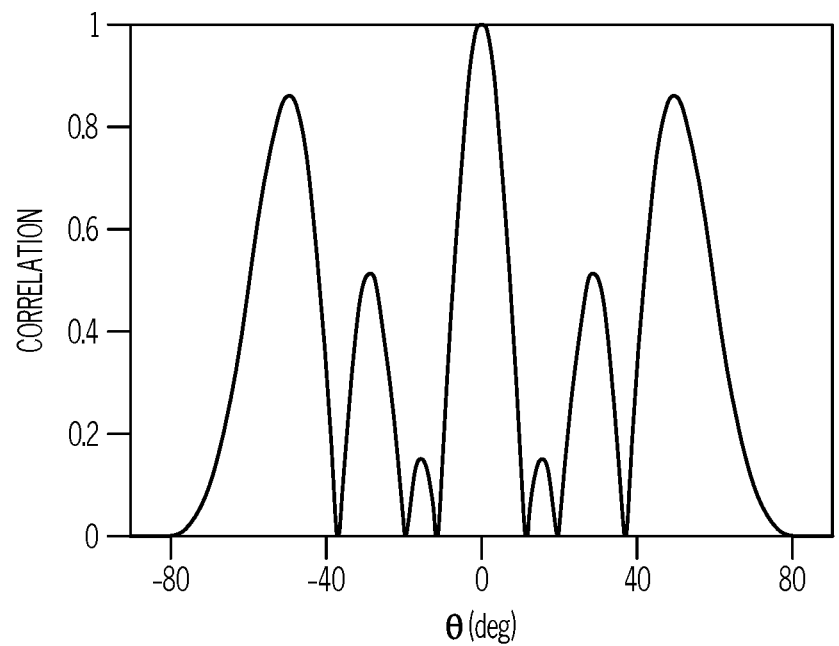

To determine the presence of ambiguity, one evaluates the correlation between $u(\theta)$ for the ground truth AoA $\theta_1$ and all other angles. FIGS. 8A and 8B are plots of the correlation between $u(0)$ and $u(\theta)$ for the uniform array case and the non-uniform array case, respectively, in accordance with an embodiment of the present invention. As shown in FIGS. 8A and 8B, there are many correlation peaks. The one around the ground truth angle is the main peak, while the others are side peaks. If there is a side peak at $\theta_2$ with magnitude of one, $u(\theta_2)$ is identical to $u(\theta_1)$. In this case, $P(\theta_1, d)$ and $P(\theta_2, d)$ have the same value based on Eq. 3 and $\theta_2$ is an ambiguity for $\theta_1$. Reducing the magnitude of side peaks reduces ambiguity. In one embodiment, the SNR is increasing using beamforming in the time domain, which combines the signals sampled from different times. In one embodiment, the difference between the side peak and one determines the margin to tolerate noise under low SNR scenarios. Therefore, the MIC array is selected that maximizes the noise margin by solving the following optimization:

$$\max_{[m_1, m_2, \ldots, m_N]} \left\{ 1 - \max_{\theta_1} \{\text{side}(\theta_1)\} \right\},$$
$$\text{s.t.} \quad m_n = M,$$
$$m_i + m_{n+1-i} = M,$$

where function side $(\theta_i)$ returns the highest side peak in the correlation plot for $\theta_1$, and a search over all $\theta_1$ is performed to find the maximum side peak given a MIC array. The first constraint requires that the array size equals to a constant M, which guarantees that all candidate arrays give similar MUSIC accuracy (though different ambiguities). The second constraint requires that the array is symmetric to the center so that forward-backward smoothing can be applied. Forward-backward smoothing removes the coherence among multi-path signals and improves the MUSIC performance.

In one embodiment, M is selected as 8 cm so that the array can easily fit for smart speakers. Solving the optimization gives one an optimal array [0, 3 cm, 5 cm, 8 cm]. Its correlation plot for the ground truth AoA at 0 degrees is shown in FIG. 8B. The 2D MUSIC profile under −20 dB SNR is shown in FIG. 7B, where the spikes around potential ambiguity angles (±50 degrees) are much weaker than that around the ground truth. Given that SNR, the average magnitude of the ground truth spike is 6× that of ambiguity spikes based on these measurements, which makes it easy to select the correct peak.

Figure 9A:
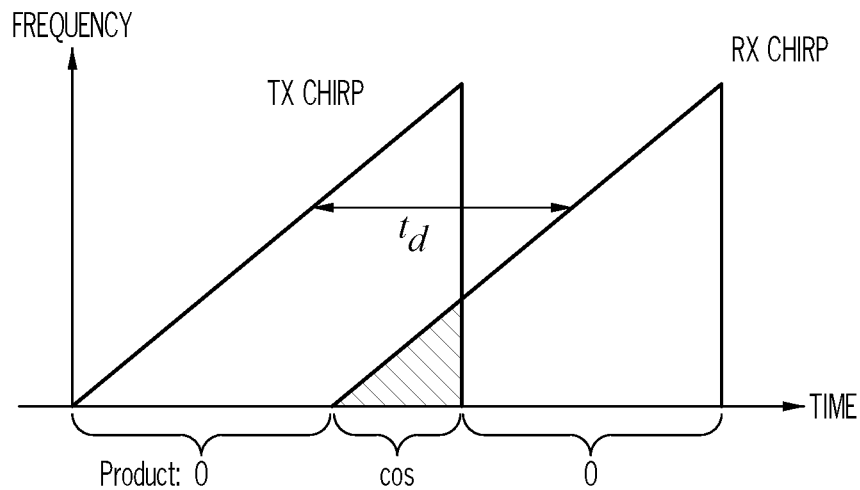
FIG. 9A illustrates that the length of sinusoid signals depends on the overlap between two chirps in accordance with an embodiment of the present invention.

To use the 2D MUSIC algorithm for joint estimation, in one embodiment, one multiplies the transmitted and received chirps and use low-pass filtering to get the sinusoid signals (Eq. 1), whose frequencies are proportional to AoA and propagation delay. The length of the sinusoid signals depends on the overlap between two chirps, since the product outside that region is simply zero, as shown in FIG. 9A in accordance with an embodiment of the present invention. For room-scale tracking, the propagation delay is large due to the slow propagation speed of the acoustic signals (e.g., around 30 ms for 5 m distance between user 103 and smart speaker 101). As shown by FIG. 9A, this significantly reduces the length of the derived sinusoid signals since a typical chirp lasts only tens of milliseconds. The reduced signal length has a detrimental impact on the MUSIC algorithm performance.

Figure 9B:
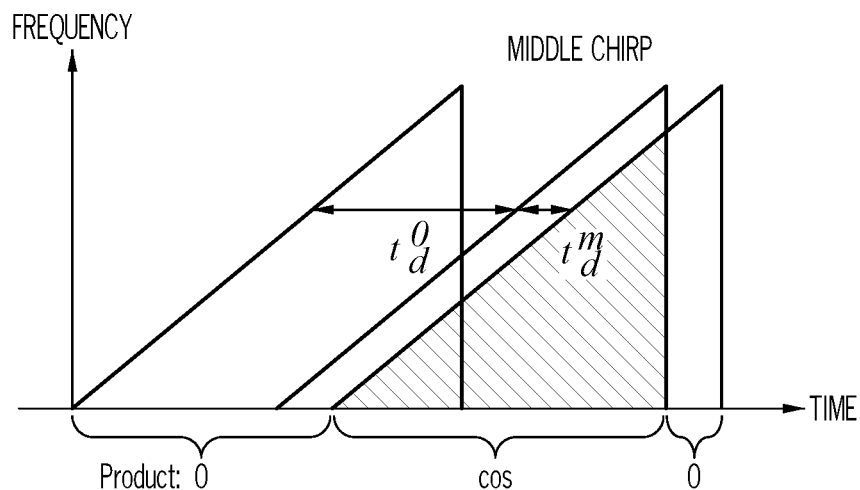
FIG. 9B illustrates a middle chirp in accordance with an embodiment of the present invention.

To address this issue, a middle chirp is introduced as shown in FIG. 9B in accordance with an embodiment of the present invention. It is a time shifted version of the transmitted chirp. The amount of shift $t_d^o$ is pre-determined based on a rough estimation on the propagation delay of the received chirp. As a result, the middle chirp has large overlap with the received chirp. In one embodiment, the 2D MUSIC algorithm is applied to the sinusoid signals derived by multiplying these two chirps. The AoA estimated in this way is equal to that of the received chirp because AoA is determined by the difference between the propagation delay to different MICs (i.e., δ in Eq. 1) and shifting the transmitted chirp by the same amount for all MICs does not change the difference. The propagation delay $t_d^m$ estimated in this way is the delay between the middle chirp and the received chirp. The total propagation delay for the received chirp is the sum of $t_d^o$ and $t_d^m$, as shown in FIG. 9B. The use of middle chirps improves accuracy due to an increased number of effective samples used for estimation.

This approach requires a rough knowledge about the propagation delay of the received chirp. The estimation results in the previous tracking periods are used for this purpose because the user's hand position 102 will not change significantly during consecutive periods (tens of ms). For tracking at the very beginning, an approach was developed to determine the hand's initial position as discussed below.

Figure 10:
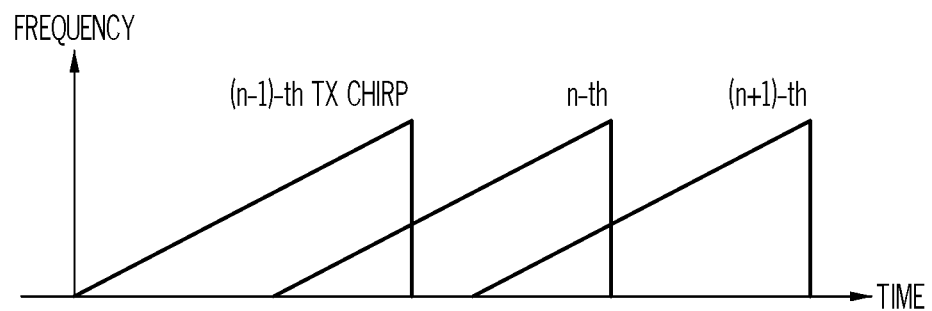
FIG. 10 illustrates sending overlapping chirps in accordance with an embodiment of the present invention.

Another way to increase the number of samples used for 2D MUSIC estimation is to increase the chirp length. However, this may increase the tracking latency, which is undesirable. To increase the chirp length without increasing the latency, overlapping chirps are sent as shown in FIG. 10. FIG. 10 illustrates sending overlapping chirps in accordance with an embodiment of the present invention. Interestingly, these chirps can be sent over the same channels without increasing the bandwidth requirement as long as they can be separated in time. That is, all reflections from the previous chirp should arrive before the first reflection from the next chirp. This suggests the time difference between the overlapping chirps should be at least the maximum propagation time, denoted as $t_d^{max}$. For tracking range up to 5 m, $t_d^{max}$ is 30 ms. Therefore, in one embodiment, 40 ms was selected between two consecutive chirps to provide an additional 10 ms cushion to differentiate between reflections from two consecutive chirps. This allows one to update measurements every 40 ms, which is sufficient for smart speaker usage scenarios. By using overlapping chirps, one can afford using a longer chirp duration. In experiments, 80 ms chirps were used.

Different from RF signals, acoustic samples reported from hardware are real numbers. Therefore, real sinusoids (see Eq. 1) are obtained after multiplying the transmitted and received chirps. However, MUSIC is an approach to estimate frequencies for complex sinusoids, while a real sinusoid cos(p) consists of two complex sinusoids e±jp. As a result, the number of complex sinusoids seen by MUSIC is actually twice that of received reflections. Based on Eq. 4, the increased number of sinusoids has a negative effect on MUSIC performance. To avoid that problem, the negative frequencies of the signals are removed by 1) performing FFT on the signals, 2) setting negative frequency bins as zeros, and 3) performing IFFT. In this way, each reflection corresponds to only one complex sinusoid. Removing negative frequencies reduces both the signals and noise by half, and SNR does not change after the removal.

Joint estimation using 2D MUSIC involves two computationally intensive steps. The first one is eigenvalue decomposition to derive the noise-space eigenvector matrix N, and its computation cost increases with the size of eigenvectors (NT×1), where N is the number of MICs and T is the number of time domain samples. The other step is evaluating the 2D profile (Eq. 3) for all combinations of AoA and distance. Its computation cost depends on the matrix multiplication of each evaluation, which is O((NT)2), and the number of AoA-distance combinations. In an embodiment of the system of the present invention, the number of MICs N is 4, while the number of acoustic samples T is 3528 under the 44.1 KHz sampling rate and 80 ms chirp. Therefore, NT is significant and these two steps are too expensive for real-time processing.

As a result, to reduce the complexity of the computation, sub-sampling based processing and spatial smoothing were used. These techniques effectively reduce T without degrading MUSIC performance. The time for eigenvalue decomposition is reduced to 2.2 ms. But evaluating the 2D profile remains high: close to 500 ms. This is due to a large number of possible AoA-distance combinations.

Consequently, the number of distances to evaluate is reduced. For 1D scenarios, root-MUSIC is used to avoid evaluating the 1D profile over a large space. It estimates the frequency of a 1D sinusoid by finding the roots to a polynomial, whose coefficients are determined by the noise-space matrix N. However, for 2D scenarios, finding the roots becomes more costly.

Figure 11:
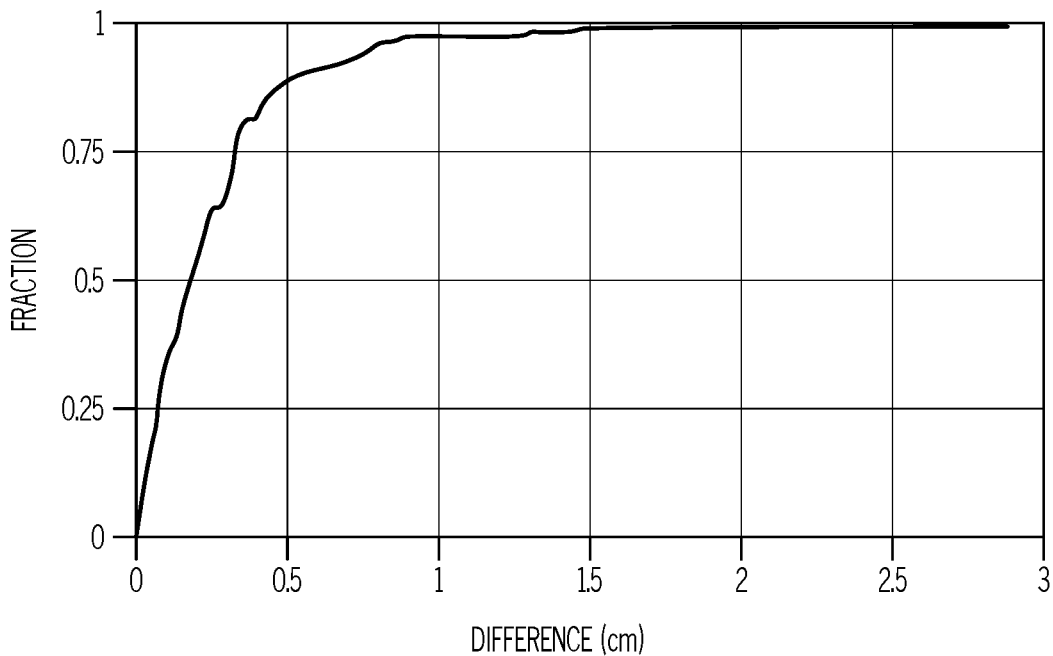
FIG. 11 illustrates the difference of estimating distance using the 1D MUSIC algorithm and the 2D MUSIC algorithm in accordance with an embodiment of the present invention.

To reduce the cost of evaluating the 2D profile, the following observations are relied upon. Given Eq. 1, the 1D MUSIC algorithm can be applied over time dimension to estimate the propagation delay $t_d$. The phase term (−fδn) does not depend on time and hence is treated as a constant here. The distance is derived by multiplying $t_d$ with the speed of sound. The distance estimated in this manner is close to that of the joint estimation using the 2D MUSIC algorithm. This is because T is large so that there are enough virtual sensors in this dimension. As shown in FIG. 11 in accordance with an embodiment of the present invention, the difference of estimating distance using the 1D MUSIC algorithm and the 2D MUSIC algorithm is within 5 mm for 90% of measurements, and 1 cm for more than 95% of the measurements. Therefore, in one embodiment, the 1D MUSIC algorithm is applied to estimate the distance, and then the 2D MUSIC algorithm is used for joint estimation but only to evaluate the 2D profile around the estimated distance (i.e., ±2 cm). This significantly reduces the number of times to compute Eq. 3, thereby reducing the computation time.

To further reduce the cost of computing, the denominator of Eq. 3 is transformed to $$u(\theta)^H (v(d) \otimes I_N)^H NN^H (v(d) \otimes I_N) u(\theta).$$

The property that $v \otimes u = (v \otimes I_n) u$ is leveraged, where v and u are column vectors and $I_n$ is the identity matrix with the same number of rows as u. Let Q(d) denote $(v(d) \otimes I_N)^H NN^H (v(d) \otimes I_N)$. It is observed that Q(d) does not depend on θ, and its size is only N×N, which is very small due to the small number of MICs. Based on these observations, the 2D profile P(θ, d) is evaluated in the following way:

Given any d, Q(d) is first evaluated. The computation cost of this step is $O(N(NT)^2)$, since the sizes of $v(d) \otimes I_N$ and $NN^H$ are NT×N and NT×NT, respectively. Here it is assumed that $NN^H$ is evaluated in advance, since N does not depend on any angle or distance.

For all possible θ, P(θ, d) is evaluated by $$\frac{1}{u(\theta)^H Q(d) u(\theta)}.$$

The cost of each evaluation is only $O(N^2)$, since the sizes of u(θ) and Q(d) are N×1 and N×N, respectively.

Repeat above procedure for all possible d.

In this manner, the average cost of computing P(θ, d) for each AoA-distance pair is $O(N^3 T^2/N_a + N^2)$, where $N_a$ is the number of possible AoA and the cost of computing Q(d) into $N_a$ computations is amortized involving the same d. In comparison, directly computing Eq. 3 requires $O(N^2 T^2)$. Since $N \ll N_a$ and $T \gg 1$ in the system of the present invention, the above approach significantly reduces the cost of evaluating P(θ, d). As a result, such an approach reduces the time for each joint estimation from 520 ms to 31 ms.

In another embodiment, a machine learning algorithm can be used to map the AoA-distance profile to distance and AoA estimates. A recurrent neural network (RNN) is utilized to automatically learn the mapping from the 2D profile to the AoA and distance. The RNN is used to exploit the temporal locality in the hand movement. For example, even if the 2D profiles are noisy at some periods, one can leverage the 2D profiles in the recent periods to help improve estimation. Moreover, it can potentially learn the Doppler shift by analyzing the consecutive 2D profiles and compensate its effect.

Figure 12:
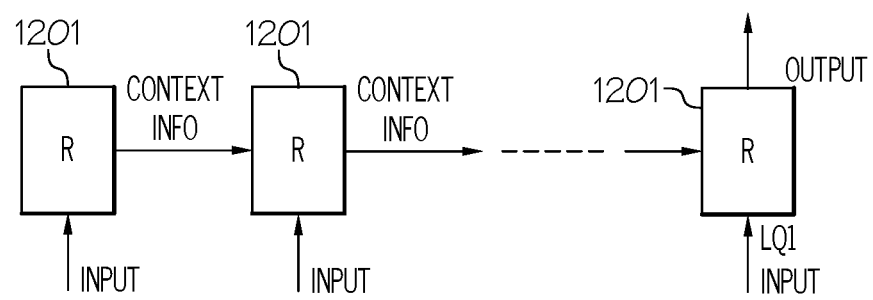
FIG. 12 illustrates a Recurrent Neural Network (RNN) used to map the angle-of-arrival (AoA)-distance profile to AoA and distance estimation in accordance with an embodiment of the present invention.

In one embodiment, the RNN contains K stages. These stages correspond to the 2D profiles extracted in the latest K periods as shown in FIG. 12. FIG. 12 illustrates a Recurrent Neural Network (RNN) used to map the angle-of-arrival (AoA)-distance profile to AoA and distance estimation in accordance with an embodiment of the present invention. Referring to FIG. 12, each stage has the same network structure (denoted as R 1201). The last stage takes the current 2D profile as the input, and the earlier stages take the previous profiles as the input. Each stage also feeds certain context information to the next stage.

Figure 13:
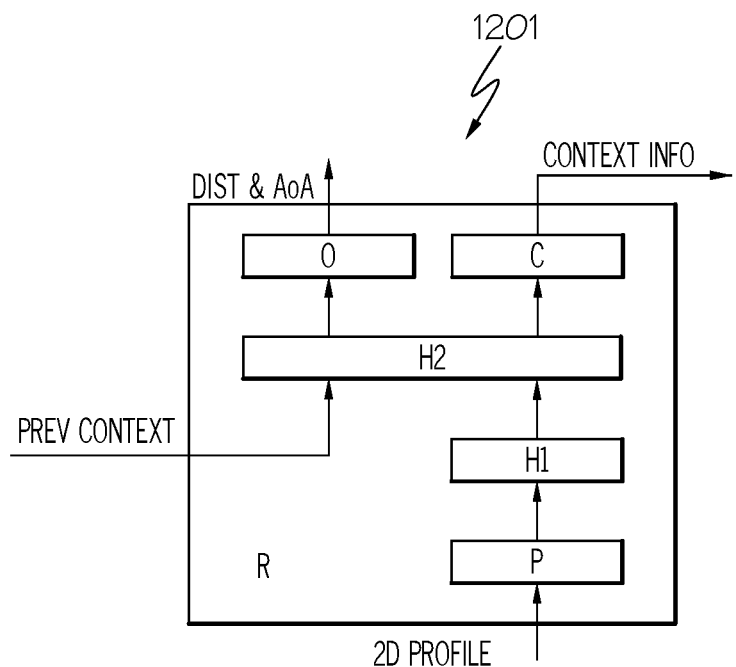
FIG. 13 is a stage in RNN in accordance with an embodiment of the present invention.

A RNN consists of a series of identical network structures R 1201. The design of R 1201 has a profound impact on the effectiveness of the RNN. FIG. 13 illustrates stage R 1201 in the RNN in accordance with an embodiment of the present invention. Referring to FIG. 13, the network takes two inputs: the context from the previous stages and the current 2D profile. First, the 2D profile goes through an average-pooling layer P. This layer segments the input profile into multiple blocks, and each block contains B×B pixels. The output from P consists of an average pixel magnitude of each block. Effectively, the P layer compresses the 2D profile by a factor of B×B. This significantly reduces the number of parameters in the network and prevents overfitting. Feeding the original 2D profile to the P layer is better than directly using a 2D profile at a coarse granularity because the latter may miss sharp peaks, which are common under high SNR. The pooling layer is followed by a hidden layer H1. The layer extracts features from the compressed prolayer O and the context layer C. Layer H1 is followed by hidden layer H2 which extracts features from the hidden layer H1 and the context from the previous stages to output layer O and layer C.

Layer O contains two neurons that represent the estimated distance and AoA. The output of layer O is only used at the last stage since they represent the current position.

The context layer C is used to automatically learn what information needs to be forwarded into the next stage. Essentially, it is another hidden layer, which consists of multiple neurons and connects the consecutive stages in the RNN.

In one embodiment, a two-dimensional profile corresponding to a region with a specified size around the previous position of the target is generated and used to derive the position of the target. To enhance both accuracy and efficiency, only the 2D profile over a small area around the target position is generated, instead of covering the whole room. Specifically, assuming that the target position is roughly known, a detection window around it is selected to cover the distance from $B_D$ to $B_D + W_D$ and the AoA from $B_A$ to $B_A + W_D$. Only the 2D profile in this window is evaluated and used as the network input. The output from the RNN is the distance and AoA relative to the boundary of the detection window. When the peak appears at the lower left corner of the profile, the RNN estimates both the distance and AoA as zero. When the peak is at the upper right corner, the network estimates them as $W_D$ and $W_A$, respectively. One can derive the final distance and AoA as the sum of the relative position and the lower left corner of the window (i.e., ($B_D$, $B_A$)).

The benefits of using this strategy are manifold. First, it significantly reduces the computation cost by only evaluating the profile in a local area. Second, the RNN trained at a specific distance or AoA can be applied to another distance or AoA by selecting a proper detection window. Third, it makes the network less sensitive to the environment by filtering out the interfering paths outside the window. Fourth, it can track multiple users simultaneously by using multiple detection windows.

This mechanism requires a rough knowledge about target positions. Hence, the initialization scheme is used to determine the initial window. During tracking, the window is updated when the target moves close to the boundary. In one embodiment, the window covers a 60 cm×60 cm area so no accurate target positions are needed.

In one embodiment, the RNN is trained using training traces comprised of a sequence of a ground truth position and angle-of-arrival-distance profiles over a time window. In one embodiment, the sequence of the angle-of-arrival-distance profiles is applied to the RNN to obtain estimates for the angle-of-arrival and the distance. In one embodiment, the angle of arrival is estimated based on a recurrent neural network, where training traces that include a sequence of a ground truth angle of arrival with angle-of-arrival profiles over a time window are used to train the recurrent neural network and the sequence of the angle-of-arrival profiles is applied to the recurrent network to obtain estimates for the angle of arrival. In another embodiment, the distance is estimated based on a recurrent neural network, where training traces that include a sequence of a ground truth distance with distance profiles over a time window are used to train the recurrent neural network and the sequence of the distance profiles is applied to the recurrent network to obtain estimates for the distance.

Figure 14:
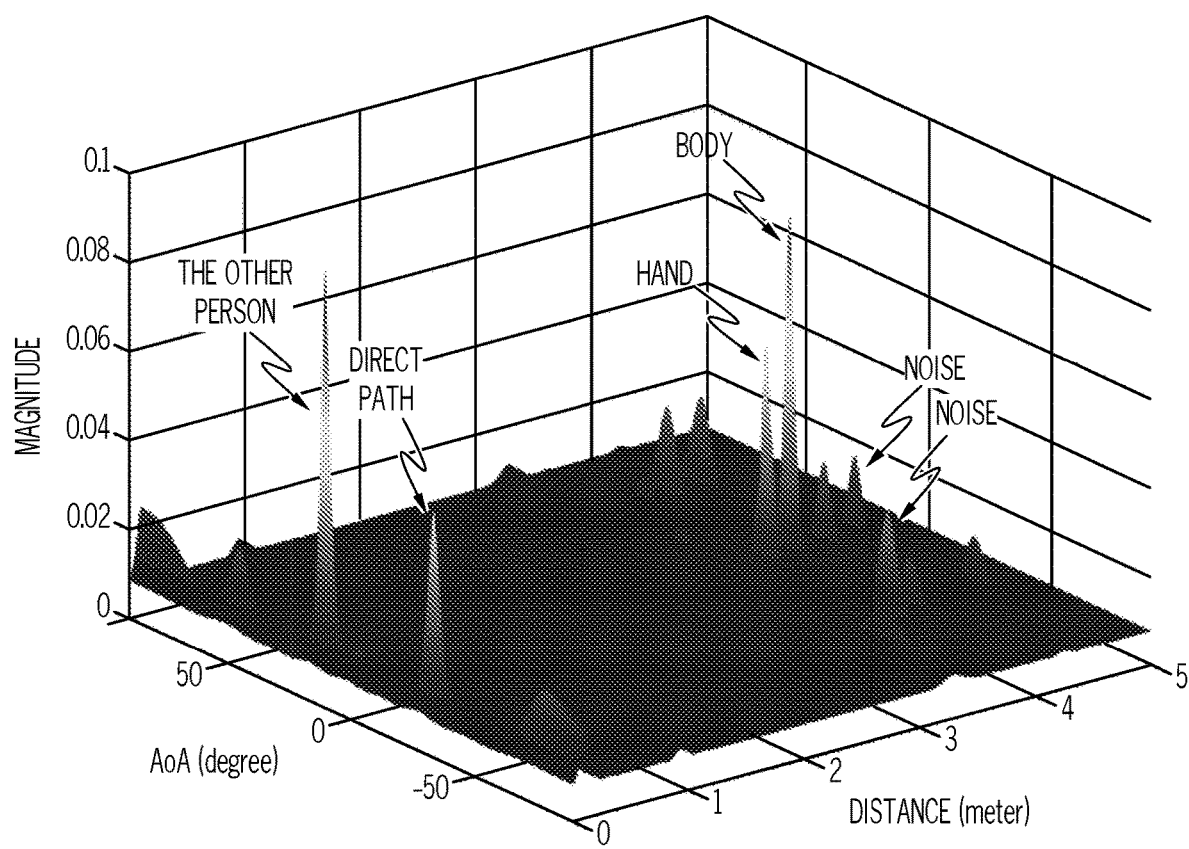
FIG. 14 illustrates the angle-of-arrival (AoA)-distance profile for a room in accordance with an embodiment of the present invention.

As previously discussed, each reflection corresponds to a spike in the AoA-distance profile derived from the 2D MUSIC algorithm. One of these spikes is selected to correspond to the hand reflection. This is challenging when user 103 is far away from device 101 since hand reflection 404 is not dominant in this case. FIG. 14 illustrates the AoA-distance profile for a room in accordance with an embodiment of the present invention. The distance between the user's hand 102 and device 101 is 3.6 m. Even after interference cancellation, it is observed that there are spikes besides hand reflections. These spikes correspond to the user's body reflections 401, dynamic background reflections 402, and noise (e.g., self-interference 403). The spike corresponding to the user's hand 102 is not necessarily the strongest one.

Since it is ambiguous as to which spike corresponds to hand 102 based on one snapshot, the temporal relationship from multiple snapshots over time is exploited. In one embodiment, user 103 is asked to perform an initial gesture and identify the spikes whose trajectory over time matches the gesture. In one experiment, user 103 is asked to push out his hand 102 during initialization. The desirable spikes should change linearly over time. This pattern is used to identify hand 102. FIG. 15 is a graph showing the spikes for hand 102 and the body of user 103 over 1 second in accordance with an embodiment of the present invention. As shown in FIG. 15, the spikes corresponding to hand reflections change linearly over time. That is, the spikes for the direct path remain unchanged and those for dynamic background reflections 402 and noise (e.g., self-interference 403) exhibit random patterns. In experiments, it has been shown that most of the time user 103 only needs to push once to clearly determine the initial hand position. For reliability, user 103 may be asked to push twice.

Based on these observations, spikes are extracted from the 2D MUSIC profiles during the initialization stage (i.e., 1 second). All the spikes are clustered using the k-means algorithm, where k is the maximum number of spikes detected in each tracking period during this stage. For each cluster, all points are fitted in the cluster using a line, which corresponds to the initialization gesture. The cluster that gives the smallest fitting error (i.e., R-square metric is closest to 1) is selected. The latest spike in that cluster is chosen as the initial hand position. Once the initial position is determined, one can select the spike closest to the previous spike for subsequent continuous tracking.

Returning back to FIG. 3B, in conjunction with FIGS. 1-2 and 4-13, in step 310, device 101 determines if user 103 performed a command based on a location of hand 102 in a recent time window. In one embodiment, device 101 stores a previous number of hand locations (e.g., previous ten locations), such as in memory 202. In one embodiment, such stored locations can be extrapolated into a motion or movement, such as a swirl motion. For example, each location of hand 102 is determined via an x, y coordinate system. As a result, the changes in the x, y coordinates as hand 102 moves are determined which correspond to a movement or motion. In one embodiment, a data structure (e.g., table) storing commands associated with a type of movement or motion is stored in memory 202 of device. After extrapolating the motion or movement of hand 102, the data structure is evaluated to determine if such motion or movement (e.g., swirl motion) corresponds to a command (e.g., increase volume). If device 101 determines that user 103 intended device 101 to perform a command, device 101 then executes such a command. A "command," as used herein, refers to any type of instruction to be performed by device 101, including movement of an avatar.

In step 311, a determination is made by device 101 as to whether user 103 performed a hand motion corresponding to a command. If the user's hand motion corresponded to a command, then, in step 312, device 101 executes such a command as discussed above.

If, however, device 101 determined that the user's hand motion did not correspond to a command, then device 101 continues to transmit audio signals to user 103 in step 301 of FIG. 3A.

In this manner, a device, such as a smart device (e.g., smart speaker), can be controlled via the user's motion, such as the user's hand, either by itself or jointly with voice-based control. As a result, the functionality or capability of devices, such as smart devices, is improved by enabling the user to control the device via motion. This is especially important for individuals who are disabled, who may find it easier to command a device via motion than other means, such as by speaking.

Furthermore, by enabling the device to be controlled via motion in addition to voice-control, the accuracy in controlling the device is vastly improved. As a result, the user does not spend as much time in attempting to correctly command the device to perform a particular operation (e.g., increase volume).

Furthermore, the present invention improves the technology or technical field involving controlling devices. As discussed above, currently, smart devices, such as smart speakers, are controlled via voice commands. However, voice-based control is not always suitable. For example, voice control degrades significantly in a noisy environment due to interference. In addition, developing smart speakers that can understand multiple languages for families with members speaking different languages and automatically identifying the language being used is challenging and costly. Moreover, in several usage scenarios, such as interacting with a screen or selecting from many menu options, interacting with a voice-based interface can be cumbersome. In comparison, motion-based control is appealing in these scenarios, and complements well with the voice-based control. Unfortunately, there is not currently a means for controlling such smart devices, such as smart speakers, using motion, such as hand motion, either independently or jointly with voice-based control.

As discussed above, the present invention improves such technology by enabling the user to control the device, such as a smart device, using motion, such as hand motion.

While the foregoing discusses the present invention in connection with tracking a hand, the principles of the present invention may be used to track any type of object, such as a credit card, a piece of paper or a mobile device.

Figure 16:
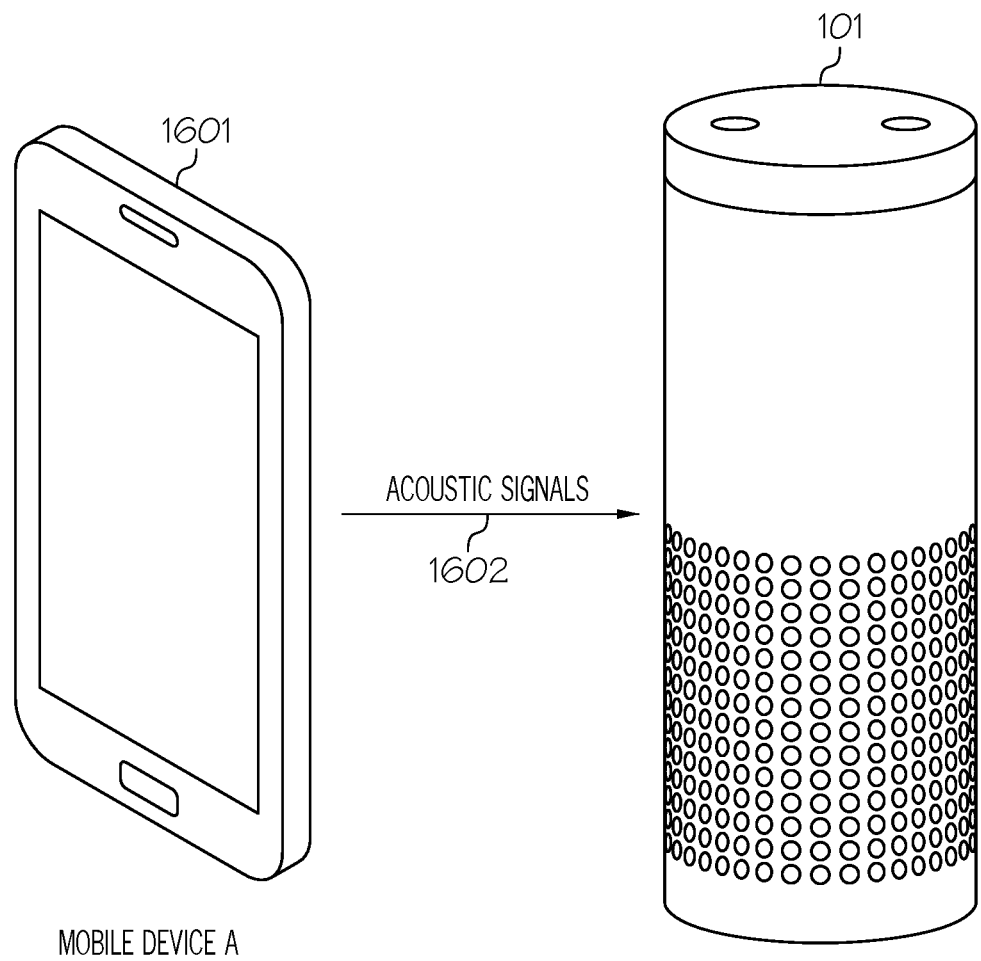
FIG. 16 illustrates device-based tracking, where a mobile device A emits acoustic signals and the multiple microphones on the other device can track the mobile device A's movement based on the received signals in accordance with an embodiment of the present invention.
Figure 17:
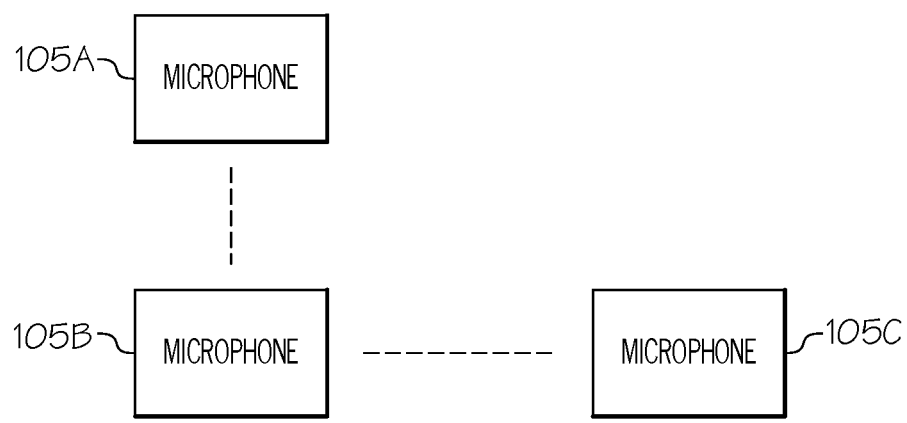
FIG. 17 illustrates the multiple microphones on the other device used to track the movement of an object, such as a mobile device, in accordance with an embodiment of the present invention.
Figure 17:
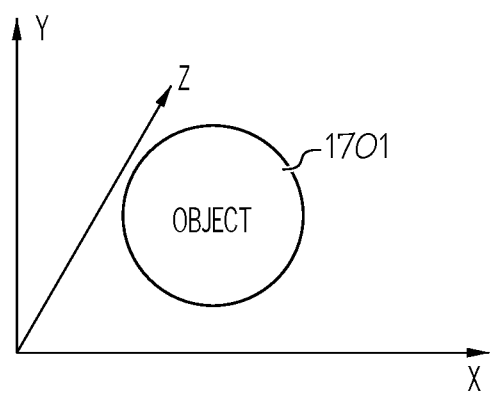

In one embodiment, device 101 directly receives the signals from the object to be tracked, such as a smartphone, as opposed to collecting reflections of the transmitted signals. For example, as shown in FIG. 16, FIG. 16 illustrates device-based tracking, where a mobile device A 1601 emits acoustic signals 1602 and the multiple microphones on the other device 101 (see FIG. 1) can track the movement of mobile device A 1601 based on the received signals in accordance with an embodiment of the present invention. FIG. 17 illustrates the multiple microphones 105A-105C on the other device 101 used to track the movement of an object 1701, such as mobile device A 1601 of FIG. 16, in accordance with an embodiment of the present invention. Microphones 105A-105C may collectively or individually be referred to as microphones 105 or microphone 105, respectively. While FIG. 17 illustrates three microphones 105, the principles of the present invention are not to be limited in scope to any particular number of microphones 105.

Referring to FIGS. 1, 16 and 17, device 101 receives the acoustic signals transmitted by the object (e.g., smartphone) using one or more microphones 105 in device 101. Device 101 transforms at least a portion of the received signals into two-dimensional sinusoids whose frequencies are proportional to an angle-of-arrival and a propagation distance of the received signals. Device 101 derives an angle-of-arrival-distance profile by evaluating frequencies of the two-dimensional sinusoids. Device 101 estimates the angle-of-arrival and distance from the angle-of-arrival-distance profile. Device 101 may estimate the frequency offset between device 101 and the device that transmits the acoustic signals. In one embodiment, the frequency offset is estimated based on a change in the peak in the angle-of-arrival-distance profile or the distance profile when both the sender and receiver are static. Device 101 adjusts the distance estimate using the frequency offset. In one embodiment, the angle of arrival is estimated based on a peak in either the angle-of-arrival-distance profile or the angle of arrival profile. Device 101 determines a current location of the object (e.g., smartphone) based on the selected angle-of-arrival-distance pair. Device 101 then determines if user 103 moved to perform a command based on prior and current locations of the object. Device 101 will then perform a command in response to determining that user 103 moved to perform the command.

In one embodiment, device 101 can obtain three-dimensional (3D) coordinates from two-dimensional (2D) coordinates. In one embodiment, device 101 uses the received signals collected from microphones 105 lying along the x-axis to obtain the x-z coordinate, and then uses the received signals collected from microphones 105 lying along the y-axis to obtain the y-z coordinate. Then, device 101 uses the derived x-z and y-z coordinate to form the x-y-z coordinate.

In other words, device 101 converts two-dimensional coordinates of a target (e.g., smartphone) into a three-dimensional coordinate by estimating multiple angle-of-arrival-distance pairs using different sets of microphones 105 and converting the estimated angle-of-arrival-distance pairs into a three-dimensional coordinate.

Such an embodiment may be implemented for both device-based and device-free tracking.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for tracking a movement of an object, the method comprising:
receiving acoustic signals from said object using one or more microphones in a device;
transforming at least a portion of said received acoustic signals into sinusoids whose frequencies are proportional to an angle-of-arrival and a propagation distance of said object;
deriving an angle-of-arrival-distance profile by evaluating frequencies of said sinusoids;
estimating an angle of arrival and a distance based on said angle-of-arrival-distance profile; and
determining a current location of said object based on said estimated angle of arrival and said estimated distance.

2. The method as recited in claim 1 further comprising:
determining if a user moved to perform a command based on prior and current locations of said object; and
performing a command on said device in response to determining said user moved to perform said command.

3. The method as recited in claim 1 further comprising:
estimating said angle of arrival and said distance from said angle-of-arrival-distance profile based on a recurrent neural network, wherein training traces that comprise a sequence of a ground truth position and angle-of-arrival-distance profiles over a time window are used to train said recurrent neural network and the sequence of said angle-of-arrival-distance profiles is applied to said recurrent neural network to obtain estimates for said angle of arrival and said distance.

4. The method as recited in claim 1 further comprising:
estimating said angle of arrival based on a recurrent neural network, wherein training traces that comprise a sequence of a ground truth angle of arrival with angle-of-arrival profiles over a time window are used to train said recurrent neural network and the sequence of said angle-of-arrival profiles is applied to said recurrent network to obtain estimates for said angle of arrival.

5. The method as recited in claim 1 further comprising:
estimating said distance based on a recurrent neural network, wherein training traces that comprise a sequence of a ground truth distance with distance profiles over a time window are used to train said recurrent neural network and the sequence of said distance profiles is applied to said recurrent network to obtain estimates for said distance.

6. The method as recited in claim 1 further comprising:
performing an initialization to determine an initial position of said object which corresponds to an initial angle-of-arrival-distance pair in said angle-of-arrival-distance profile.

7. The method as recited in claim 1 further comprising:
performing interference cancellation to said received acoustic signals to remove static background reflection.

8. The method as recited in claim 1, wherein said angle-of-arrival-distance profile is obtained using a 2D MUSIC algorithm.

9. The method as recited in claim 1 further comprising:
estimating a frequency offset between a sender and a receiver of said acoustic signals based on a change in a peak in said angle-of-arrival-distance profile when both said sender and said receiver are static, wherein said frequency offset is used to adjust said estimated distance.

10. The method as recited in claim 1, wherein said device comprises said one or more microphones whose placement maximizes a noise margin between a side peak and a main peak in a correlation.

11. The method as recited in claim 1 further comprising:
increasing a signal-to-noise ratio using beamforming in a time-domain.

12. The method as recited in claim 1 further comprising:
identifying peaks in said angle-of-arrival-distance profile corresponding to positions of one or more objects.

13. The method as recited in claim 1, wherein said object comprises a mobile device or a reflector comprising a hand of a user, a user body, a wallet, a card, a cup or a book.

14. The method as recited in claim 1, wherein said distance is estimated based on a peak in either said angle-of-arrival-distance profile or a distance profile.

15. The method as recited in claim 1, wherein said angle of arrival is estimated based on a peak in either said angle-of-arrival-distance profile or an angle of arrival profile.

16. The method as recited in claim 1, wherein said device converts two-dimensional coordinates of a target into a three-dimensional coordinate by estimating multiple angle-of-arrival-distance pairs using different sets of microphones and converting said estimated multiple angle-of-arrival-distance pairs into a three-dimensional coordinate.

17. The method as recited in claim 1, wherein a two-dimensional profile corresponding to a region with a specified size around a previous position of said object is generated and used to derive a current position of said object.

18. A computer program product for tracking a movement of an object, the computer program product comprising a computer readable storage medium having program code embodied therewith, the program code comprising the programming instructions for:
receiving acoustic signals from said object using one or more microphones in a device;
transforming at least a portion of said received acoustic signals into sinusoids whose frequencies are proportional to an angle-of-arrival and a propagation distance of said object;
deriving an angle-of-arrival-distance profile by evaluating frequencies of said sinusoids;
estimating an angle of arrival and a distance based on said angle-of-arrival-distance profile; and
determining a current location of said object based on said estimated angle of arrival and said estimated distance.

19. The computer program product as recited in claim 18, wherein the program code further comprises the programming instructions for:
determining if a user moved to perform a command based on prior and current locations of said object; and
performing a command on said device in response to determining said user moved to perform said command.

20. A device, comprising:
a memory for storing a computer program for tracking a movement of an object; and
a processor connected to said memory, wherein said processor is configured to execute the program instructions of the computer program comprising:
receiving acoustic signals from said object using one or more microphones in a device;
transforming at least a portion of said received acoustic signals into sinusoids whose frequencies are proportional to an angle-of-arrival and a propagation distance of said object;
deriving an angle-of-arrival-distance profile by evaluating frequencies of said sinusoids;
estimating an angle of arrival and a distance based on said angle-of-arrival-distance profile; and
determining a current location of said object based on said estimated angle of arrival and said estimated distance.

* * * * *

UNITED STATES PATENT AND TRADEMARK OFFICE
CERTIFICATE OF CORRECTION

PATENT NO. : 11,474,194 B2
APPLICATION NO. : 17/269671
DATED : October 18, 2022
INVENTOR(S) : Qiu et al.

Page 1 of 1

It is certified that error appears in the above-identified patent and that said Letters Patent is hereby corrected as shown below:

In the Specification

Please replace "+ *vec(W)*" at Column 12, Line 25 with "+ *vee(W)*".

Please replace "= $(V \otimes U)$ e+w," at Column 12, Line 27 with "= $(V \otimes U)$ c+w,".

Please replace "c" at Column 13, Line 38 with "$\mathcal{E}$".

Signed and Sealed this
Twenty-sixth Day of December, 2023

Katherine Kelly Vidal
*Director of the United States Patent and Trademark Office*